US012287600B2

(12) United States Patent
Fujiwara et al.

(10) Patent No.: US 12,287,600 B2
(45) Date of Patent: *Apr. 29, 2025

(54) DRUM UNIT, DRIVE TRANSMISSION UNIT, CARTRIDGE AND ELECTROPHOTOGRAPHIC IMAGE FORMING APPARATUS

(71) Applicant: CANON KABUSHIKI KAISHA, Tokyo (JP)

(72) Inventors: Akihiro Fujiwara, Ibaraki (JP); Ryuta Murakami, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,284

(22) Filed: Oct. 18, 2023

(65) Prior Publication Data

US 2024/0045364 A1 Feb. 8, 2024

Related U.S. Application Data

(60) Division of application No. 17/532,021, filed on Nov. 22, 2021, which is a continuation of application No. PCT/JP2020/023319, filed on Jun. 9, 2020.

(30) Foreign Application Priority Data

Jun. 12, 2019 (JP) ................................ 2019-109671

(51) Int. Cl.
*G03G 15/00* (2006.01)
*G03G 21/18* (2006.01)

(52) U.S. Cl.
CPC ....... *G03G 15/757* (2013.01); *G03G 21/1853* (2013.01); *G03G 21/186* (2013.01)

(58) Field of Classification Search
CPC ............ G03G 15/757; G03G 21/1853; G03G 21/186; G03G 15/75; G03G 21/1647;
(Continued)

(56) References Cited

U.S. PATENT DOCUMENTS 6,735,405 B2 5/2004 Yokoi et al.
6,836,639 B2 12/2004 Karakama et al.
(Continued)

FOREIGN PATENT DOCUMENTS

CL 201600526 A 2/2017
CL 202001574 A 10/2020
(Continued)

OTHER PUBLICATIONS

International Search Report and Written Opinion for International Patent Application No. PCT/JP2020/023319.
(Continued)

*Primary Examiner* — Francis C Gray
(74) *Attorney, Agent, or Firm* — Venable LLP

(57) ABSTRACT

To accomplish engagement between a coupling member and a drive transmission member of main assembly.
A drum unit includes a photosensitive drum and a coupling member which is provided adjacent to an end portion of the photosensitive drum and which is connected with the photosensitive drum so as to be capable of drive transmission. the coupling member is inclinable relative to a rotational axis of the photosensitive drum, and an inclination angle relative to photosensitive drum is reduced with rotational driving operation.

15 Claims, 16 Drawing Sheets

(58) Field of Classification Search
CPC ........... G03G 21/1671; G03G 21/1814; G03G 21/1857; G03G 2221/1657
See application file for complete search history.

(56) References Cited

U.S. PATENT DOCUMENTS

| | | | | |
|---|---|---|---|---|
| 6,898,392 | B2 | 5/2005 | Karakama et al. | |
| 6,987,938 | B2 | 1/2006 | Murakami et al. | |
| 7,024,131 | B2 | 4/2006 | Komatsu et al. | |
| 7,156,797 | B2 | 1/2007 | Komatsu et al. | |
| 7,206,534 | B2 | 4/2007 | Murakami | |
| 8,275,286 | B2 | 9/2012 | Jeno et al. | |
| 8,280,278 | B2 * | 10/2012 | Ueno | G03G 15/751 399/167 |
| 8,620,181 | B2 | 12/2013 | Murakami | |
| 8,630,564 | B2 | 1/2014 | Ueno et al. | |
| 8,682,215 | B1 | 3/2014 | Ueno et al. | |
| 9,052,638 | B2 | 6/2015 | Matsumaru et al. | |
| 9,069,289 | B2 | 6/2015 | Batori et al. | |
| 9,116,466 | B2 | 8/2015 | Makiguchi et al. | |
| 9,164,430 | B2 | 10/2015 | Murakami et al. | |
| 9,188,906 | B2 | 11/2015 | Batori et al. | |
| 9,188,945 | B2 | 11/2015 | Anan et al. | |
| 9,229,371 | B2 | 1/2016 | Murakami et al. | |
| 9,342,047 | B2 | 5/2016 | Fujiwara et al. | |
| 9,465,318 | B2 | 10/2016 | Takeuchi et al. | |
| 9,523,942 | B2 | 12/2016 | Takeuchi et al. | |
| 9,599,932 | B2 | 3/2017 | Takeuchi et al. | |
| 9,678,471 | B2 | 6/2017 | Ueno et al. | |
| 9,684,261 | B2 | 6/2017 | Miyabe et al. | |
| 9,690,248 | B2 | 6/2017 | Iijima et al. | |
| 9,733,614 | B2 | 8/2017 | Ueno et al. | |
| 9,746,826 | B2 | 8/2017 | Ueno et al. | |
| 9,841,727 | B2 | 12/2017 | Ueno et al. | |
| 9,841,728 | B2 | 12/2017 | Ueno et al. | |
| 9,841,729 | B2 | 12/2017 | Ueno et al. | |
| 9,846,408 | B2 * | 12/2017 | Ueno | G03G 21/1814 |
| 9,857,764 | B2 | 1/2018 | Ueno et al. | |
| 9,857,765 | B2 | 1/2018 | Ueno et al. | |
| 9,864,331 | B2 | 1/2018 | Ueno et al. | |
| 9,864,333 | B2 | 1/2018 | Ueno et al. | |
| 9,869,960 | B2 | 1/2018 | Ueno et al. | |
| 9,874,846 | B2 | 1/2018 | Ueno et al. | |
| 9,874,854 | B2 | 1/2018 | Ueno et al. | |
| 9,989,892 | B2 | 6/2018 | Takeuchi et al. | |
| 10,095,161 | B2 | 10/2018 | Takeuchi et al. | |
| 10,168,665 | B2 | 1/2019 | Miyabe et al. | |
| 10,175,629 | B2 | 1/2019 | Nieda | |
| 10,303,116 | B2 | 5/2019 | Naba et al. | |
| 10,539,923 | B2 | 1/2020 | Ueno et al. | |
| 10,539,924 | B2 | 1/2020 | Ueno et al. | |
| 10,551,793 | B2 | 2/2020 | Ueno et al. | |
| 10,585,391 | B2 | 3/2020 | Ueno et al. | |
| 10,627,780 | B2 | 4/2020 | Fujiwara et al. | |
| 10,671,018 | B2 | 6/2020 | Ueno et al. | |
| 10,678,184 | B2 | 6/2020 | Murakami et al. | |
| 10,788,788 | B2 | 9/2020 | Inaba et al. | |
| 10,877,433 | B2 | 12/2020 | Ueno et al. | |
| 10,901,366 | B2 | 1/2021 | Murakami et al. | |
| 10,962,927 | B2 | 3/2021 | Fujiwara et al. | |
| 11,061,364 | B2 | 7/2021 | Uesugi et al. | |
| 11,061,369 | B2 | 7/2021 | Miyabe et al. | |
| 11,067,949 | B2 | 7/2021 | Miyabe et al. | |
| 11,169,483 | B2 | 11/2021 | Murakami et al. | |
| 11,237,517 | B2 | 2/2022 | Ueno et al. | |
| 2005/0191092 | A1 | 9/2005 | Toso et al. | |
| 2007/0134021 | A1 | 6/2007 | Yamada et al. | |
| 2008/0152388 | A1 | 6/2008 | Jeno et al. | |
| 2008/0260428 | A1 | 10/2008 | Ueno et al. | |
| 2009/0317132 | A1 | 12/2009 | Asanuma et al. | |
| 2010/0209144 | A1 * | 8/2010 | Nieda | G03G 21/1647 399/167 |
| 2011/0038649 | A1 | 2/2011 | Miyabe et al. | |
| 2011/0091239 | A1 | 4/2011 | Ueno et al. | |
| 2012/0014713 | A1 | 1/2012 | Murakami et al. | |
| 2012/0014722 | A1 | 1/2012 | Okino et al. | |
| 2012/0243905 | A1 | 9/2012 | Uratani et al. | |
| 2013/0064569 | A1 | 3/2013 | Ueno et al. | |
| 2013/0170867 | A1 | 7/2013 | Acosta et al. | |
| 2013/0287437 | A1 | 10/2013 | Miyabe et al. | |
| 2014/0056613 | A1 | 2/2014 | Ueno et al. | |
| 2014/0099144 | A1 | 4/2014 | Ueno et al. | |
| 2014/0270845 | A1 | 9/2014 | Kawakami et al. | |
| 2016/0018777 | A1 | 1/2016 | Tijima et al. | |
| 2016/0154376 | A1 * | 6/2016 | Xiao | F16D 3/265 399/111 |
| 2016/0246250 | A1 * | 8/2016 | Kamoshida | G03G 21/1671 |
| 2016/0274536 | A1 | 9/2016 | Ueno et al. | |
| 2017/0068446 | A1 | 3/2017 | Jarrous et al. | |
| 2017/0075300 | A1 | 3/2017 | Cao et al. | |
| 2017/0090405 | A1 | 3/2017 | Ueno et al. | |
| 2017/0090406 | A1 | 3/2017 | Ueno et al. | |
| 2017/0090407 | A1 | 3/2017 | Ueno et al. | |
| 2017/0090408 | A1 | 3/2017 | Ueno et al. | |
| 2017/0090409 | A1 | 3/2017 | Ueno et al. | |
| 2017/0090410 | A1 | 3/2017 | Ueno et al. | |
| 2017/0090411 | A1 | 3/2017 | Ueno et al. | |
| 2017/0090414 | A1 | 3/2017 | Ueno et al. | |
| 2017/0168446 | A1 | 6/2017 | Nieda | |
| 2017/0185027 | A1 | 6/2017 | Ueno et al. | |
| 2017/0185033 | A1 | 6/2017 | Ueno et al. | |
| 2017/0192384 | A1 | 7/2017 | Ueno et al. | |
| 2017/0192386 | A1 | 7/2017 | Ueno et al. | |
| 2017/0219985 | A1 | 8/2017 | Ijima et al. | |
| 2017/0227925 | A1 | 8/2017 | Ueno et al. | |
| 2017/0227927 | A1 | 8/2017 | Ueno et al. | |
| 2017/0248911 | A1 | 8/2017 | Miyabe et al. | |
| 2017/0357210 | A1 | 12/2017 | Inaba et al. | |
| 2017/0371296 | A1 | 12/2017 | Kamoshida et al. | |
| 2018/0364640 | A1 | 12/2018 | Ueno et al. | |
| 2019/0079448 | A1 | 3/2019 | Miyabe et al. | |
| 2019/0243306 | A1 | 8/2019 | Inaba et al. | |
| 2019/0278217 | A1 | 9/2019 | Ueno et al. | |
| 2019/0278218 | A1 | 9/2019 | Ueno et al. | |
| 2019/0278219 | A1 | 9/2019 | Ueno et al. | |
| 2020/0159165 | A1 | 5/2020 | Miyabe et al. | |
| 2020/0249624 | A1 | 8/2020 | Ueno et al. | |
| 2020/0301352 | A1 | 9/2020 | Matsumaru et al. | |
| 2020/0387108 | A1 | 12/2020 | Naba et al. | |
| 2021/0080903 | A1 | 3/2021 | Ueno et al. | |
| 2021/0149335 | A1 | 5/2021 | Fujiwara et al. | |
| 2021/0286316 | A1 | 9/2021 | Murakami et al. | |
| 2021/0286317 | A1 | 9/2021 | Murakami et al. | |
| 2021/0294241 | A1 | 9/2021 | Miyabe et al. | |
| 2022/0082984 | A1 * | 3/2022 | Fujiwara | G03G 21/1853 |

FOREIGN PATENT DOCUMENTS

| | | | | |
|---|---|---|---|---|
| CN | 102057333 | A | 5/2011 | |
| CN | 104081291 | A | 10/2014 | |
| CN | 105531632 | A | 4/2016 | |
| CN | 109116707 | A * | 1/2019 | F16D 3/16 |
| CO | 6960522 | A | 5/2014 | |
| CO | 16088043 | A | 11/2016 | |
| EP | 2 980 655 | A1 | 2/2016 | |
| EP | 3 045 979 | A1 | 7/2016 | |
| JP | 2006-163232 | A | 6/2006 | |
| JP | 2008-233868 | A | 10/2008 | |
| JP | 2009-300516 | A | 12/2009 | |
| JP | 5005053 | B2 | 8/2012 | |
| JP | 2013-122616 | A | 6/2013 | |
| JP | 2013-195961 | A | 9/2013 | |
| JP | 2014-191025 | A | 10/2014 | |
| JP | 2016-102986 | A | 6/2016 | |
| JP | 2016-218483 | A | 12/2016 | |
| JP | 2017-107066 | A | 6/2017 | |
| JP | 2017-223802 | A | 12/2017 | |
| TW | 201102772 | A1 | 1/2011 | |
| TW | 201113653 | A1 | 4/2011 | |
| WO | 2011/074707 | A | 6/2011 | |
| WO | 2019117317 | A | 6/2019 | |

(56) References Cited

OTHER PUBLICATIONS

Jun. 30, 2022 Office Action in Taiwanese Patent Application No. 109119824.
Nov. 24, 2022 Examination Report in Australian Patent Application No. 2020290276.
Jan. 9, 2023 Office Action in Canadian Patent Application No. 3,142,869.
Apr. 6, 2023 Office Action in Chilean Patent Application No. 202103282.
May 19, 2023 Office Action in Taiwan Patent Application No. 112111050.
Apr. 6, 2023 Office Action in Chilean Patent Application Pub. No. 202103282.
Jun. 16, 2023 Extended European Search Report in European Patent Application No. 20 823 625.7.
Apr. 11, 2022 Office Action in Indian Patent Application No. 202247000140.
Mar. 13, 2024 Office Action in Singapore Patent Application No. 11202113334P.
Jan. 11, 2024 Office Action in Indian Patent Application No. 202247000140.
Jan. 11, 2024 Office Action in Chinese Patent Application No. 202080042378.1 (with English translation).
Apr. 5, 2024 Office Action in Indonesia Patent Application No. P00202111882 (with English translation).
Nov. 16, 2023 Notice of Acceptance in Australian Patent Application No. 2020290276.
English translation of Japanese Patent Application Pub. No. 2013-195961.
English translation of Japanese Patent Application Pub. No. 2016-102986.
English translation of Japanese Patent Application Pub. No. 2006-163232.
Dec. 7, 2023 Notice of Allowance in Korean Patent Application No. 10-2022-700845 (with English translation).
Jan. 25, 2024 Office Action in Chilean Patent Application No. 2021-03282.
Sep. 4, 2024 Examination Report in Australian Patent Application No. 2023266346.
Mar. 5, 2024 Office Action in Japanese Patent Application No. 2020-101128.
Jun. 26, 2024 Notice of Allowance in Chilean Patent Application No. 2021-03282.
Sep. 9, 2024 Office Action in Malaysian Patent Application No. PI2021007258.
Sep. 27, 2024 Notice of Allowance in Korean Patent Application No. 10-2022-7000845.
Oct. 11, 2024 Office Action in United Arab Emirates Patent Application No. P6002246/2021.
Colombian Patent Application No. 14111800, which corresponds to Colombian Patent Application Pub. No. 6960522 A.
Colombian Patent Application No. 16088043.
Japanese Patent Application Pub. No. 2017-107066 A.
Japanese Patent Application Pub. No. 2016-102986 A.
Japanese Patent Application Pub. No. 2009-300516 A.
United States Patent Application Pub. No. 2011/0038649 A1.
United States Patent Application Pub. No. 2007/0134021 A1.
United States Patent Application Pub. No. 2017/0261926 A1.
United States Patent Application Pub. No. 2009/0317132 A1.
U.S. Pat. No. 11,061,364 B2.
U.S. Pat. No. 8,630,564 A.
Oct. 23, 2024 Office Action in Columbian Patent Application No. NC2021/0017384 (with English translation).

* cited by examiner (a)

(b)

(a)

(b)

(a)

(b)

(a)

(b)

(c)

(a)

(b)

DRUM UNIT, DRIVE TRANSMISSION UNIT, CARTRIDGE AND ELECTROPHOTOGRAPHIC IMAGE FORMING APPARATUS

FIELD OF THE INVENTION

The present invention relates to a drum unit, a drive transmission unit, a cartridge, and an electrophotographic image forming apparatus.

The electrophotographic image forming apparatus (image forming apparatus) forms an image on a recording material by using an electrophotographic image forming process. For example, it includes an electrophotographic copying machine, an electrophotographic printer (LED printer, laser beam printer, and so on), a facsimile machine, a word processor, and the like.

The cartridge is dismountably mounted to the main assembly of the electrophotographic image forming apparatus. The drum unit is a unit including a photosensitive drum. The drive transmission unit is a unit including a coupling member.

BACKGROUND OF THE INVENTION

In the electrophotographic image forming apparatus (hereinafter, also simply referred to as "image forming apparatus"), the electrophotographic photosensitive member, which is generally a drum type as an image bearing member, that is, the photosensitive drum (electrophotographic photosensitive drum) is uniformly charged. Next, an electrostatic latent image (electrostatic image) is formed on the photosensitive drum by selectively exposing the charged photosensitive drum. Then, the electrostatic latent image formed on the photosensitive drum is developed into a toner image with toner as a developer. Then, the toner image formed on the photosensitive drum is transferred onto a recording material such as recording sheet or a plastic sheet, and heat or pressure is applied to the toner image transferred on the recording material to fix the toner image, thus performing the image recording operation.

Such an image forming apparatus generally requires toner replenishment and maintenance of various process means. In order to facilitate this toner replenishment and maintenance, a photosensitive drum, charging means, developing means, cleaning means, and so on are unified inside the frame into a cartridge, which can be mounted to and dismounted from the image forming apparatus main assembly has been put into practical use.

If parts of the unit of the image forming apparatus can be mounted to and dismounted from the apparatus main assembly like this cartridge, a part of the maintenance of the apparatus can be performed by the user himself or herself without relying on the service person in charge of after-sales service. Therefore, the operability of the apparatus can be remarkably improved, and an image forming apparatus having excellent usability can be provided. Therefore, such a cartridge method is widely used with an image forming apparatus.

As an example of a cartridge that is a dismountably mountable unit, a process cartridge in which a photosensitive drum and a process means acting on the photosensitive drum are integrated (into a cartridge) is known. In the process cartridge, a structure in which a coupling member is provided at the free end of the photosensitive drum in order to transmit the driving force from the apparatus main assembly to the photosensitive drum is widely used (Japanese Laid-open Patent Application No. 2017-223802).

SUMMARY OF THE INVENTION

Problem to be Solved

The present invention provides a further development of the above-mentioned prior art.

Means for Solving the Problem

A typical structure disclosed in the present application is a drum unit usable with a cartridge, said drum unit comprising a photosensitive drum; and a coupling member provided adjacent to an end portion of the photosensitive drum and connected with the photosensitive drum so as to be capable of transmitting a driving force, wherein the coupling member is inclinable relative to a rotational axis of the photosensitive drum, and an inclination angle relative to the rotational axis of the photosensitive drum is reduced with rotational driving operation.

Another typical structure disclosed in the present application is a drive transmission unit capable of mounting to a main assembly of an electrophotographic image formation apparatus, the drive transmission unit comprising a coupling member; and a support member for supporting the coupling member, wherein the coupling member is inclinable relative to a rotational axis of the support member, and an inclination angle relative to the rotational axis of the support member reduces with driving operation. Another typical structure disclosed in the present application is a cartridge and an electrophotographic image forming apparatus comprising such a drum unit or drive transmission unit.

Effect of the Invention

It is possible to develop conventional technology.

EMBODIMENTS

Embodiment 1

In the following, Embodiment 1 will be described in detail with reference to the drawings.

The direction of the rotation axis of the electrophotographic photosensitive drum is a longitudinal direction.

Further, in the longitudinal direction, the side on which the electrophotographic photosensitive drum receives the driving force from the image forming apparatus main assembly is a driving side, and the opposite side is a non-driving side.

Figure 2:
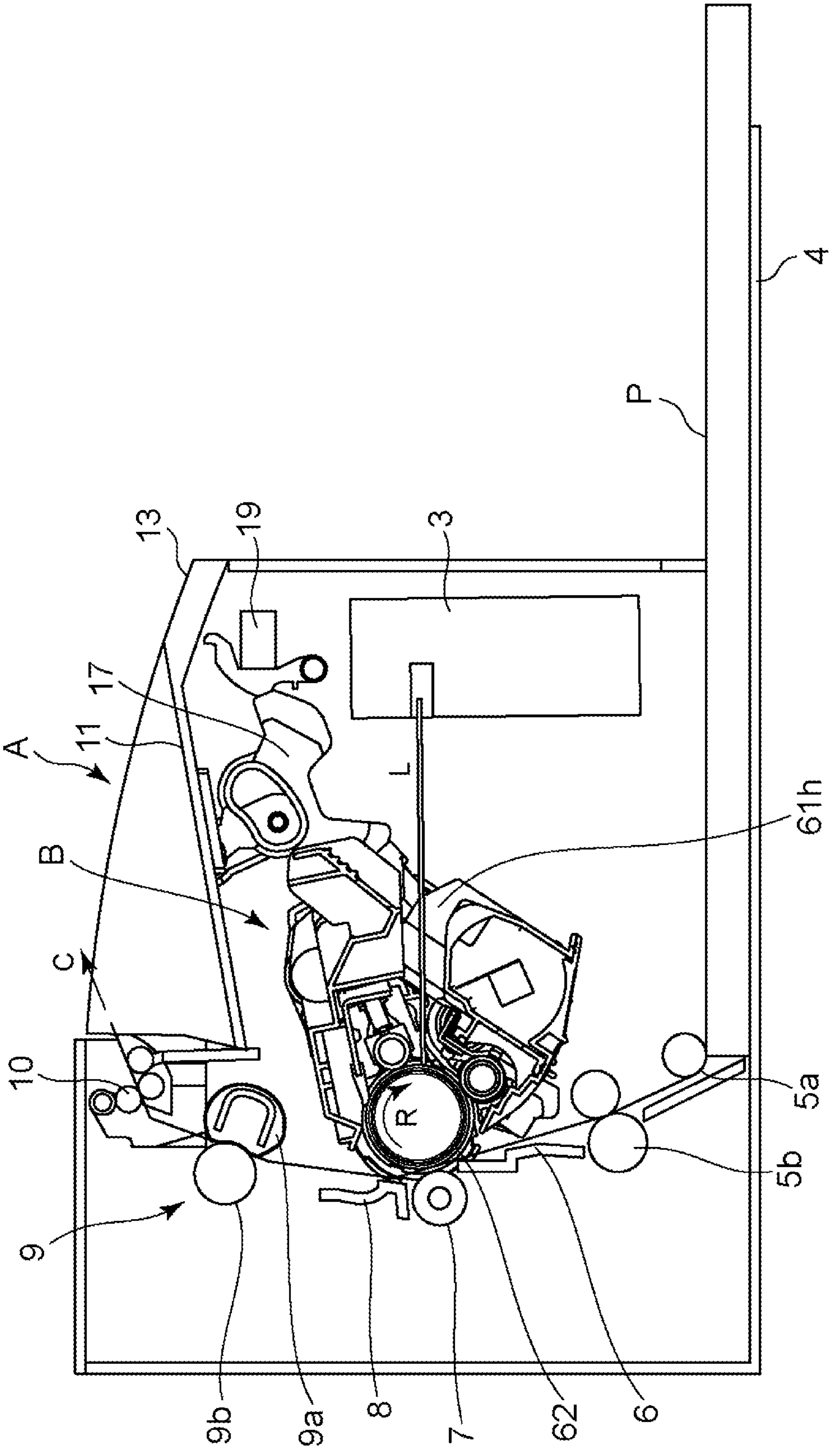
FIG. 2 is a cross-sectional view of the image forming apparatus main assembly and the process cartridge.
Figure 3:
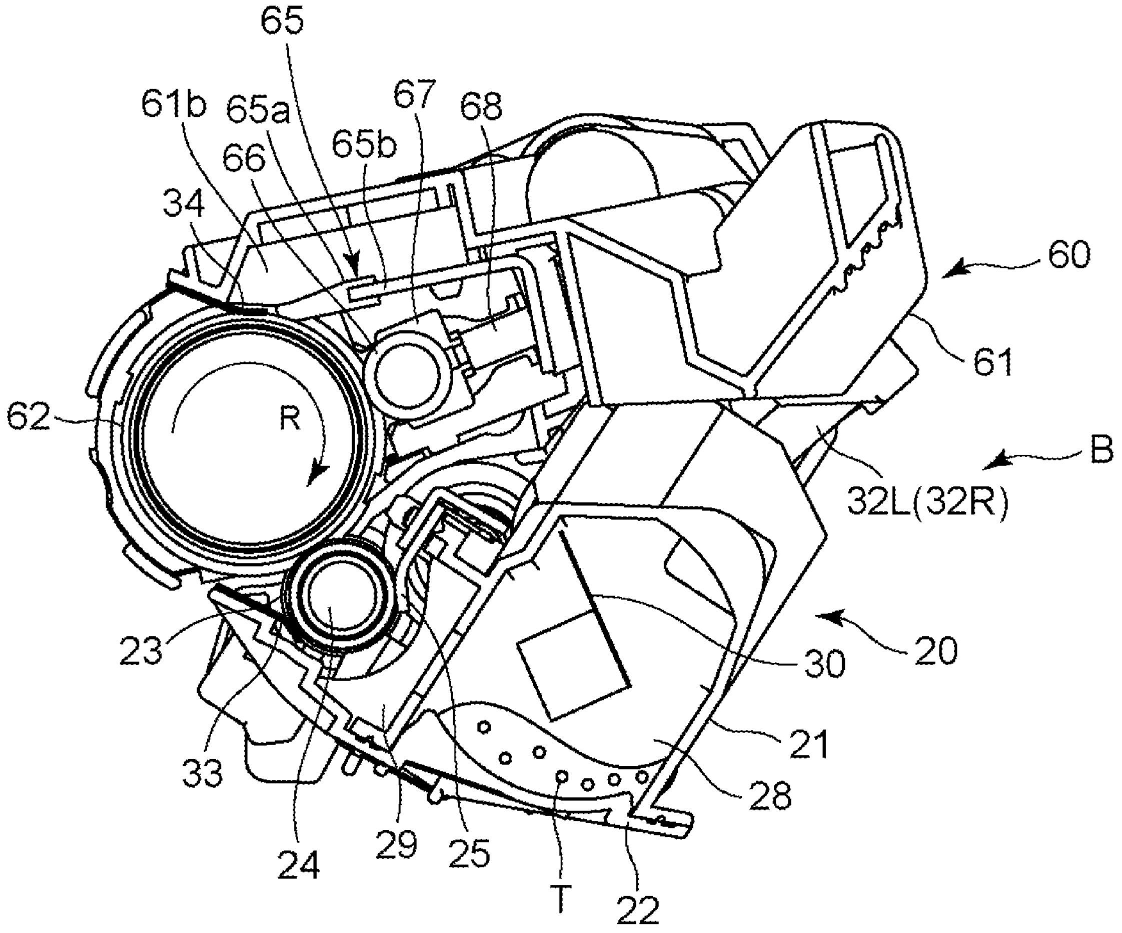
FIG. 3 is a cross-sectional view of the process cartridge.

Referring to FIGS. 2 and 3, the overall structure and the image formation process will be described.

FIG. 2 is a cross-sectional view of an apparatus main assembly (electrophotographic image forming apparatus main assembly, image forming apparatus main assembly) A and a process cartridge (hereinafter, referred to as cartridge B) of the electrophotographic image forming apparatus according to Embodiment 1.

FIG. 3 is a cross-sectional view of the cartridge B.

Here, the apparatus main assembly A is a portion of the electrophotographic image forming apparatus excluding the cartridge B.

<Overall Structure of Electrophotographic Image Forming Apparatus>

Figure 1:
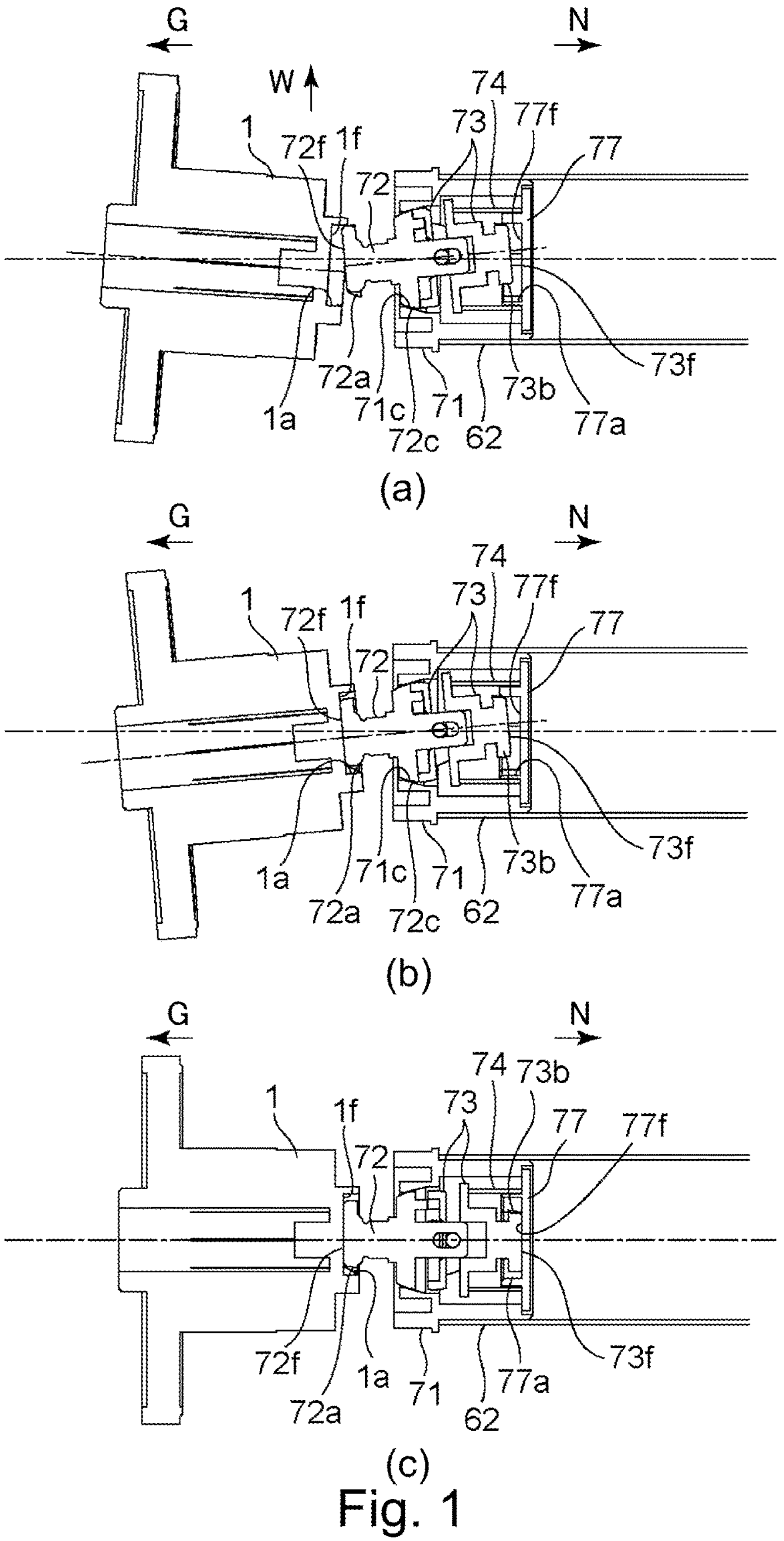
FIG. 1 is an illustration of a structure of an image forming apparatus main assembly and a process cartridge.

The electrophotographic image forming apparatus (image forming apparatus) shown in FIG. 1 is a laser beam printer using an electrophotographic system in which the cartridge B is mountable to and mountable from the apparatus main assembly A. There is provided an exposure device 3 (laser scanner unit) for forming a latent image on the electrophotographic photosensitive drum 62 as an image bearing member of the cartridge B when the cartridge B is mounted to the apparatus main assembly A. Further, a sheet tray 4 containing a recording material (hereinafter, referred to as a sheet material PA) to be subjected to image forming operation is provided under the cartridge B. The electrophotographic photosensitive drum 62 is a photosensitive member (electrophotographic photosensitive member) used for forming an electrophotographic image thereon.

Further, the apparatus main assembly An includes a pickup roller 5*a*, a feeding roller pair 5*b*, a transfer guide 6, a transfer roller 7, a feeding guide 8, a fixing device 9, a discharging roller pair 10, a discharge tray 11, and the like which are arranged along the feed direction D of the sheet material PA. The fixing device 9 comprises a heating roller 9*a* and a pressure roller 9*b*.

<Image Formation Process>

Next, the image formation process will be described in brief. In response to a print start signal, the electrophotographic photosensitive drum (hereinafter, referred to as the photosensitive drum 62, or simply the drum 62) is rotationally driven in an arrow R direction at a predetermined peripheral speed (process speed).

The charging roller (charging member) 66 to which the bias voltage is applied contacts the outer peripheral surface of the drum 62 and uniformly charges the outer peripheral surface of the drum 62.

The exposure device 3 outputs a laser beam L in accordance with the image information. The laser beam L passes through the laser opening 61*h* provided in the cleaning frame 61 of the cartridge B, and scans and exposes the outer peripheral surface of the drum 62. By this, an electrostatic latent image corresponding to the image information is formed on the outer peripheral surface of the drum 62.

On the other hand, as shown in FIG. 3, in the developing unit 20 as a developing device, the toner T in the toner chamber 28 is stirred and fed by the rotation of the feeding member (stirring member) 30, and is fed out into the toner supply chamber 29.

The toner T is carried on a surface of a developing roller 23 by a magnetic force of a magnet roller 24 (fixed magnet). The developing roller 23 is a developer carrying member which carries a developer (toner T) on the surface thereof in order to develop a latent image formed on the drum 62.

The toner T is triboelectrically charged by the developing blade 25, and the layer thickness on the peripheral surface of the developing roller 23 as the developer carrier is regulated thereby.

The toner T is supplied to the drum 62 in accordance with the electrostatic latent image to develop the latent image. By this, the latent image is visualized into a toner image. The drum 62 is an image bearing member which carries a latent image or an image formed of toner (toner image, developer image) on the surface thereof. Further, as shown in FIG. 2, the sheet material PA stored in the lower portion of the apparatus main assembly A is fed out from the seat tray 4 by the pickup roller 5*a* and the feeding roller pair 5*b* in timed relationship with the output timing of the laser beam L. Then, the sheet material PA is fed to a transfer position which is between the drum 62 and the transfer roller 7, by way of the transfer guide 6. At this transfer position, the toner image is sequentially transferred from the drum 62 onto the sheet material PA.

The sheet material PA to which the toner image is transferred is separated from the drum 62 and fed to the fixing device 9 along the feeding guide 8. Then, the sheet material PA passes through the nip portion between the heating roller 9*a* and the pressure roller 9*b* constituting the fixing device 9. Pressure application and heat fixing treatment are effected at this nip portion, and the toner image is fixed on the sheet material PA. The sheet material PA which has been subjected to the toner image fixing process is fed to the discharge roller pair 10 and discharged to the discharge tray 11.

On the other hand, as shown in FIG. 3, the drum 62 after the image transfer is used again in the image forming process after the residual toner on the outer peripheral surface is removed by the cleaning member 65. The residual toner removed from the drum 62 is stored in the waste toner chamber 61*b* of the toner cleaning unit 60. The cleaning unit 60 is a unit including a photosensitive drum 62.

In the above description, the charging roller 66, the developing roller 23, the transfer roller 7, and the cleaning member 65 are process means for acting on the drum 62.

<Overall Structure of Cartridge>

Figure 4:
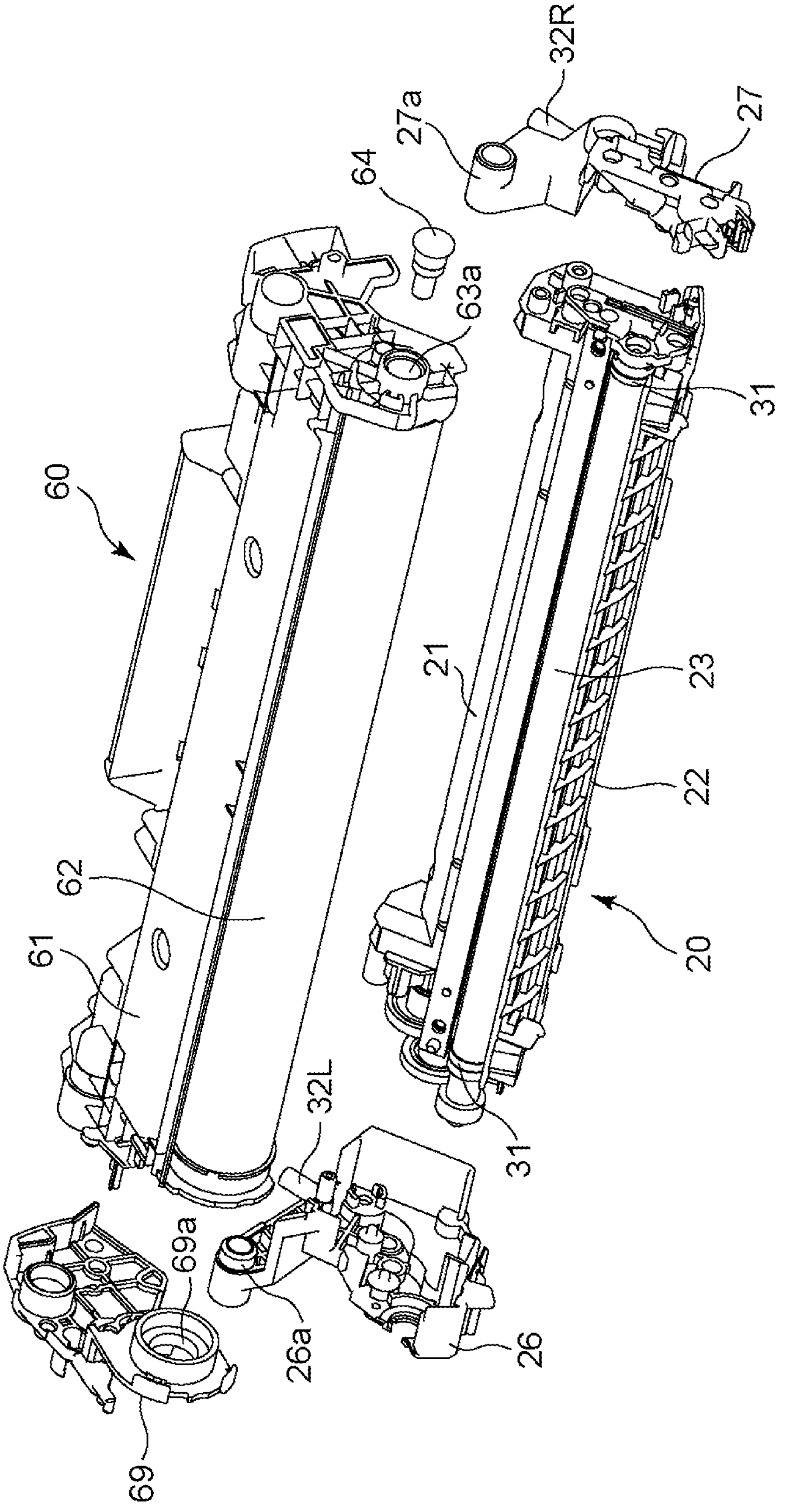
FIG. 4 is an exploded perspective view of the process cartridge.
Figure 5:
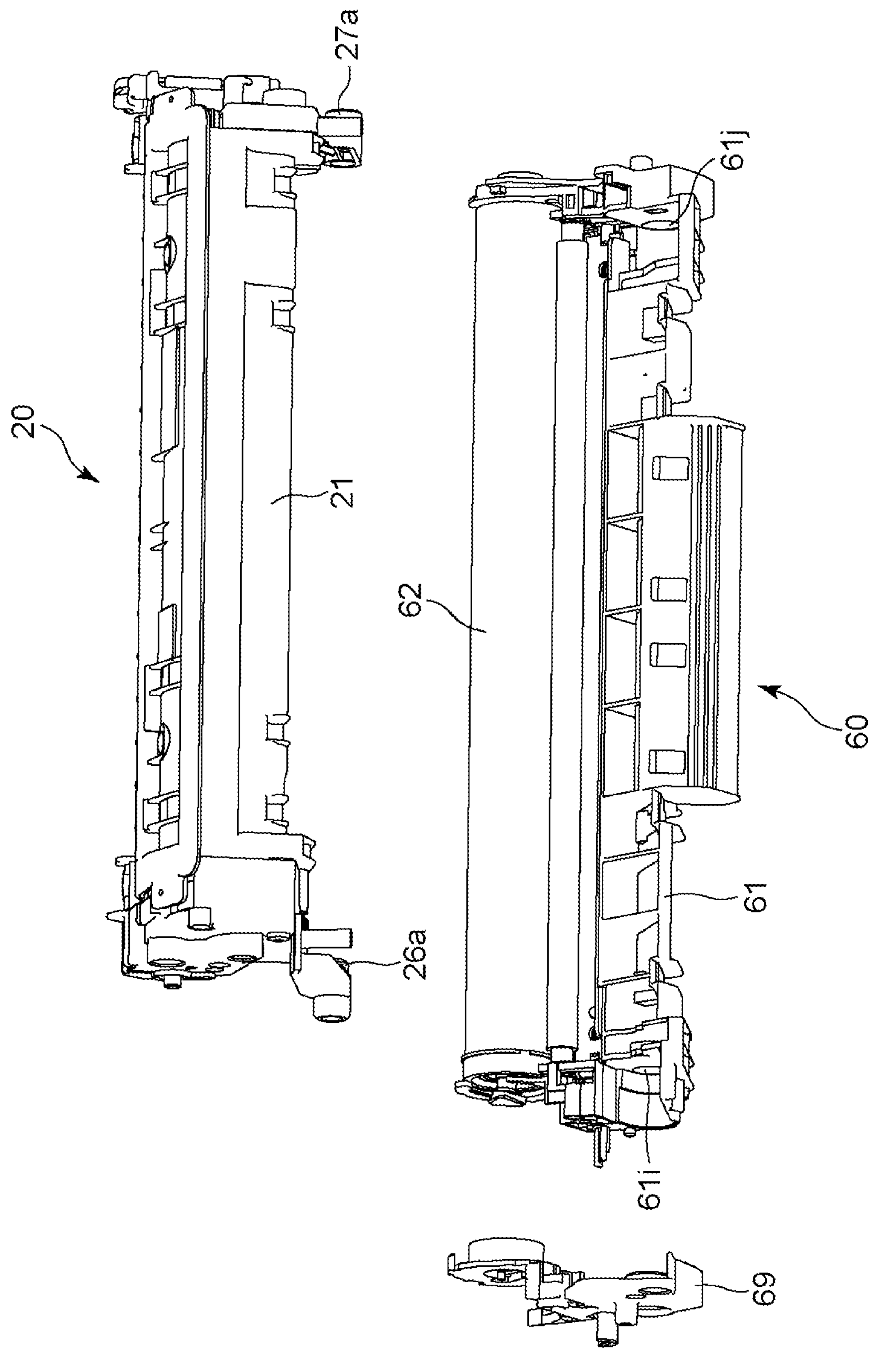
FIG. 5 is an exploded perspective view of the process cartridge.

Next, referring to FIGS. 3, 4, and 5, the overall structure of the cartridge B will be described. FIG. 3 is a cross-sectional view of the cartridge B, and FIGS. 4 and 5 are perspective views illustrating the structure of the cartridge B. In this embodiment, the screws for connecting the parts will be omitted.

Further, the description of the operating member unit including the lever member will be described hereinafter, and therefore, the description thereof is omitted here.

The cartridge B includes a cleaning unit.

As shown in FIG. 3, the cleaning unit 60 includes a drum 62, a charging roller 66, a cleaning member 65, and a cleaning frame 61 which supports them. On the driving side of the drum 62, a driving side drum flange 71 provided on the driving side is rotatably supported by a hole portion 69*a* of a drum bearing 69. In a broad sense, the drum bearing 69 and the cleaning frame 61 can also be collectively referred to as a cleaning frame.

Figure 8:
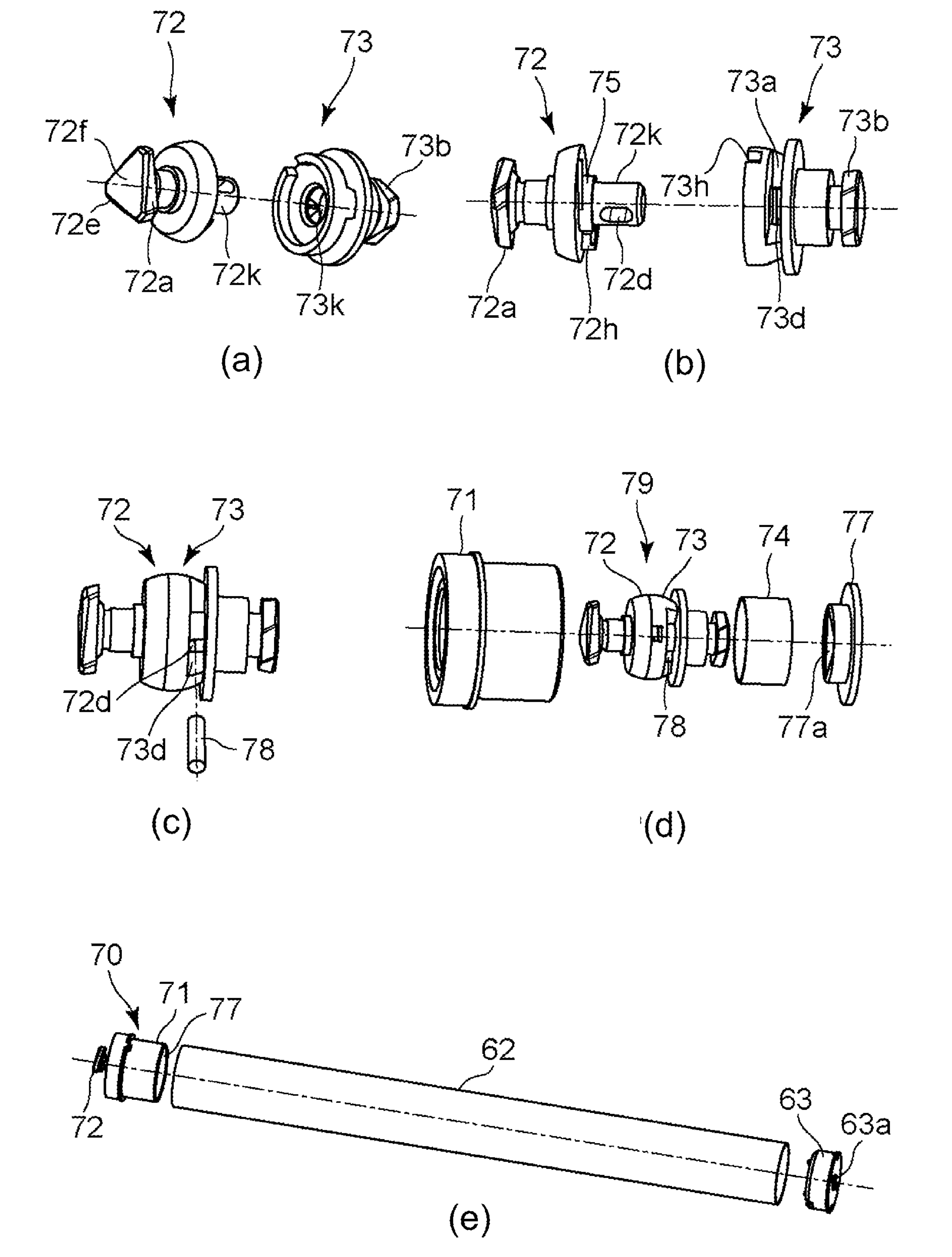
FIG. 8 is an exploded perspective view of the drum unit.

On the non-driving side, as shown in FIG. 4, the hole 63*a* (see part (e) of FIG. 8 of the non-driving side drum flange is rotatably supported by the drum shaft 64 press-fitted into the hole 61*c* provided in the cleaning frame 61.

In the cleaning unit 60, the charging roller 66 and the cleaning member are disposed in contact with the outer peripheral surface of the drum 62, respectively.

The cleaning member 65 includes a rubber blade 65*a*, which is a blade-shaped elastic member made of rubber as an elastic material, and a support member 65*b* which supports the rubber blade. The rubber blade 65*a* is in counter-directional contact with the drum 62 with respect to the rotational movement direction of the drum 62. That is, the rubber blade 65*a* is in contact with the drum 62 so that the free end portion thereof faces the upstream side in the rotational movement direction of the drum 62.

As shown in FIG. 3, the waste toner removed from the surface of the drum 62 by the cleaning member 65 is stored in the waste toner chamber 61*b* formed by the cleaning frame 61 and the cleaning member 65.

Further, as shown in FIG. 3, a receptor sheet 34 for preventing waste toner from leaking from the cleaning frame 61 is provided at the edge of the cleaning frame 61 in contact with the drum 62.

The charging roller 66 is rotatably supported by the cleaning unit 60 by way of a charging roller bearing (not shown) at opposite ends of the cleaning frame 61 in a longitudinal direction.

The longitudinal direction of the cleaning frame 61 (longitudinal direction of the cartridge B) is a direction parallel to the rotation axis of the drum 62 (axial direction). Therefore, hereinafter, the axial direction of the drum 62 is intended in the case of simply referring to longitudinal direction or axial direction without particular explanation.

The charging roller 66 is pressed against the drum 62 by pressing charging roller bearings toward the drum 62 by charging roller urging members 68. The charging roller 66 is driven by the rotation of the drum 62.

As shown in FIG. 3, the developing unit 20 includes a developing roller 23, a developing container 21 which supports the developing roller 23, a developing blade 25, and so on. The developing roller 23 is rotatably supported by the developing container 21 by a driving side bearing member 26 and a non-driving side bearing member 27 provided at the respective ends.

Further, a magnet roller 24 is provided in the developing roller 23. In the developing unit 20, a developing blade 25 for regulating the toner layer on the developing roller 23 is provided. As shown in FIG. 4, the developing roller 23 is provided at the opposite ends with the spacing member developing roller 23, and by the spacing member 31 and the drum 62 contacting with each other, the developing roller 23 is held with a minute gap between the drum 62. Further, as shown in FIG. 3, a blowout prevention sheet 33 for preventing the toner from leaking from the developing unit 20 is provided at the edge of a bottom member 22 in contact with the developing roller 23. Further, a feed member 30 is provided in the toner chamber 28 formed by the developing container 21 and the bottom member 22. The feed member 30 stirs the toner contained in the toner chamber 28 and feeds the toner to the toner supply chamber 29.

As shown in FIGS. 4 and 5, the cartridge B is constituted by combining the cleaning unit 60 and the developing unit 20.

First, the support boss 26*a* provided on the driving side bearing member 26 is fitted into the first suspension hole 61*i* on the driving side of the cleaning frame 61, and the support bosses 27*a* provided on the non-driving side bearing member 27 is fitted into the second suspension hole 61*j* on the non-driving side. By this, the developing unit 20 is rotatably connected with the cleaning unit 60 (rotatably). Thereafter, the cartridge B is formed by assembling the drum bearing 69 to the cleaning unit 60.

In this embodiment, a driving side urging member 32L and a non-driving side urging member 32R are constituted by compression springs. The urging forces of these springs urge the developing unit 20 to the cleaning unit 60, and the developing roller 23 is reliably pressed toward the drum 62. And, the developing roller 23 is held with a predetermined distance from the drum 62 by the spacing members 31 mounted to opposite ends of the developing roller 23.

<Cartridge Mounting Operation>

Figure 6:
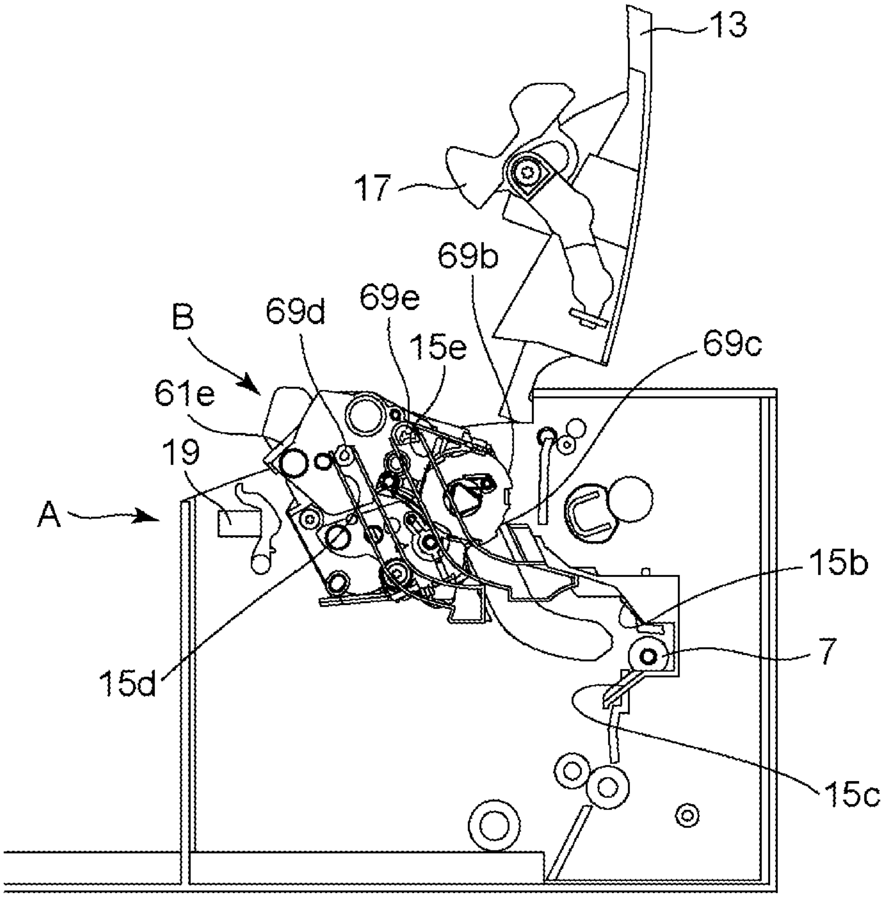
FIG. 6 is a cross-sectional view of the image forming apparatus main assembly and the process cartridge.
Figure 6:
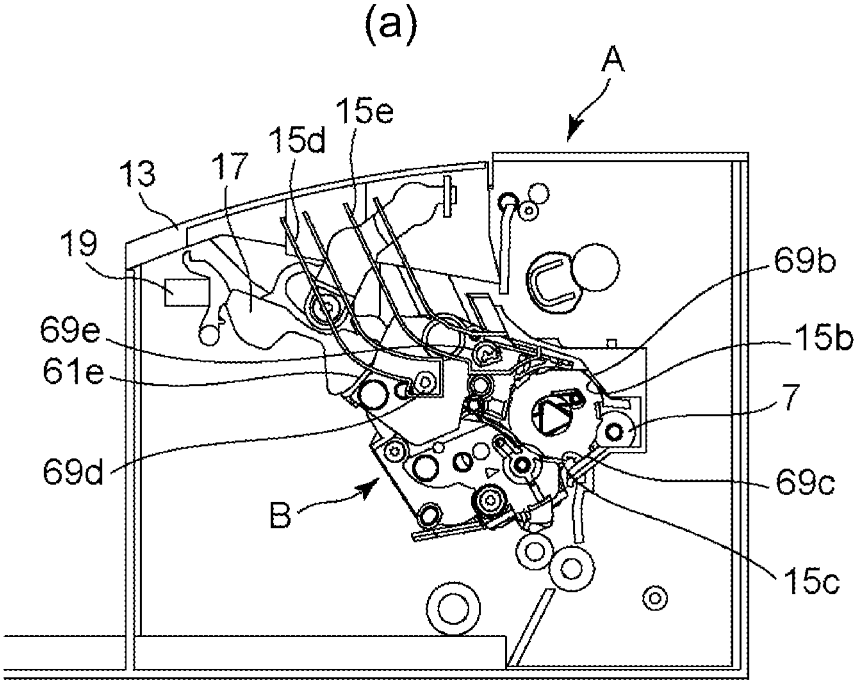
Figure 7:
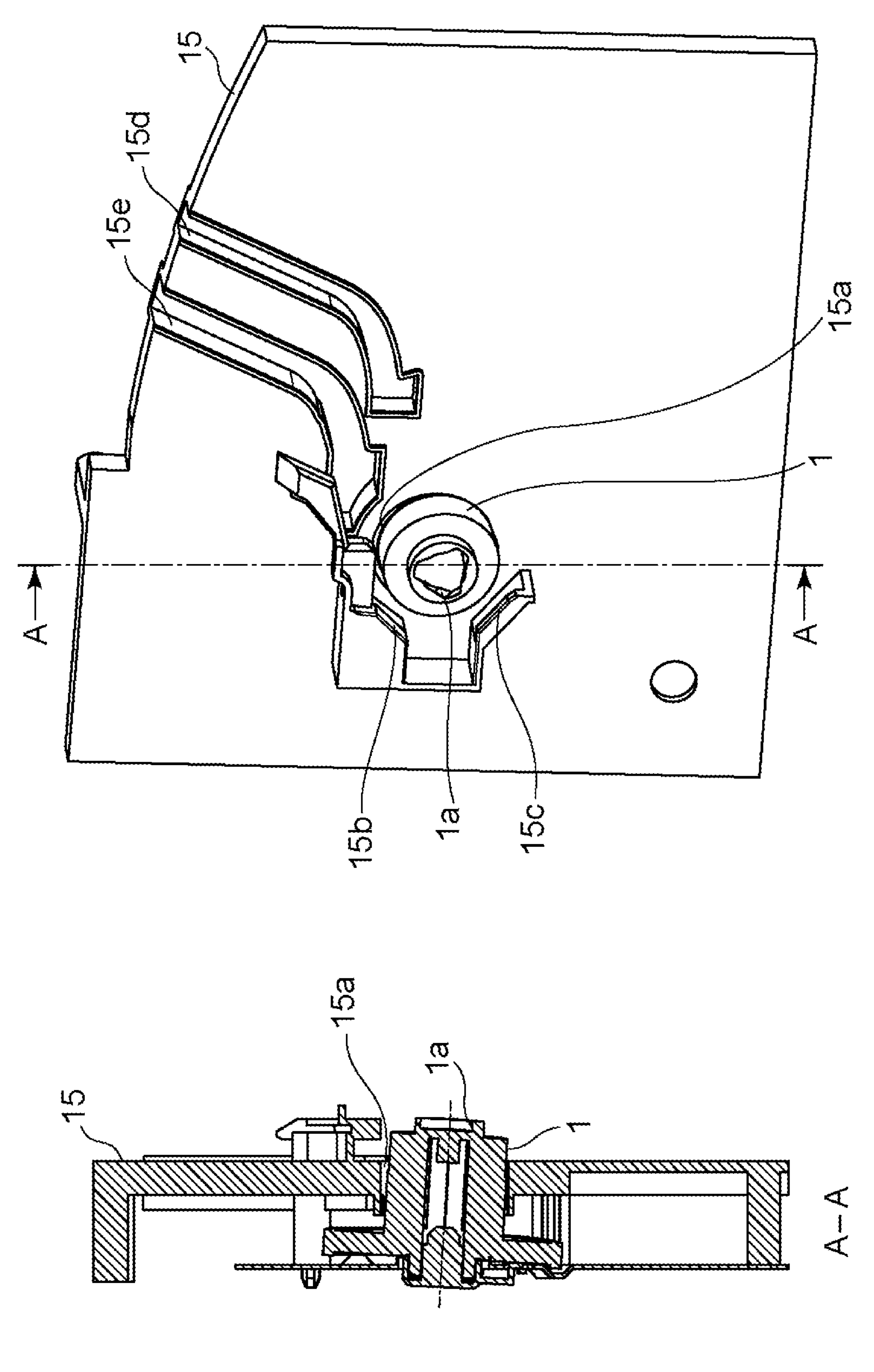
FIG. 7 is an illustration of the image forming apparatus main assembly.

Referring to part (a) of FIG. 1, FIGS. 6 and 7, the operation of mounting the cartridge B on the apparatus main assembly A in this embodiment will be described. Part (a) of FIG. 1 shows a sectional view illustrating the state of the drive transmission member (driving shaft, drive output member) and the driving side drum flange unit (drive transmission unit) 70 when the cartridge B is mounted on the apparatus main assembly A but is not driven. Part (a) of FIG. 6 is a sectional view in a state in which the cartridge B is being mounted to the apparatus main assembly A. Part (b) of FIG. 6 is a sectional view illustrating a state in which the cartridge B has been mounted on the apparatus main assembly A. FIG. 7 is an illustration of a state of the drive transmission member 1 before the cartridge B is mounted to the apparatus main assembly A.

As shown in part (a) of FIG. 6, in the mounting of the cartridge B to the apparatus main assembly, the opening/closing door 13 of the apparatus main assembly A is opened by rotating it about a rotation center (not shown). Next, the cartridge B is inserted such that the guided portions 69*d* and 69*e* of the cartridge B are guided along the guide rails 15*d* and 15*e* (only the driving side is shown). Then, as shown in part (b) of FIG. 6, the mounting of the cartridge B is completed by, the event that the positioned portions 69*b* and 69*c* provided on the drum bearing member 69 are brought into proximity or contact with the apparatus main assembly positioning portions 15*b* and 15*c*.

Two cartridge pressing members 17 are rotatably mounted to the neighborhood of opposite end portions of the opening/closing door 13 in the axial direction. Two cartridge pressing springs 19 are mounted to the opposite ends of the apparatus main assembly A in the longitudinal direction. The cleaning frame 61 is provided with cartridge pressed portions 61*e* as urging force receiving portions of the cartridge pressing spring 19 at opposite longitudinal ends. By completely closing the opening/closing door 13, a predetermined force is applied to the cartridge pressed portion 61*e* from the cartridge pressing spring 19. By this, the positioned portions 69*b* and 69*c* are maintained in contact with the apparatus main assembly positioning portions 15*b* and 15*c*, and the cartridge B is placed at a position where an image forming operation can be performed (part (b) of FIG. 6.

Here, the mounting/positioning structure and the pressing structure of the cartridge B have been described with respect to the driving side, but the same structure is used on the non-driving side.

In this embodiment, as shown in FIG. 7, one end of the drive transmission member 1 is temporarily supported in a hole portion 15*a* of a driving side lateral plate 15 of a drive transmission member 1. Before mounting the cartridge B, the drive transmission member is tilted by its own weight within the range of play (gap) existing between the hole portion 15*a* and the drive transmission member 1. Further, a first coupling portion 72 is tilted generally in the same direction as the drive transmission member 1 by the urging force of a third urging member 76 (coupling urging member, third elastic member, third spring) (FIG. 9) in order to engage with the drive transmission member 1. At this time, the rotation axes of the drive transmission member 1 and the first coupling portion 72 form an angle, and therefore, the axis of the drive transmission member 1 is deviated from the axis of the drum 62 (see part (a) of FIG. 1). In such a case, in order for the drum 62 to rotate stably during driving, it is necessary for the drum 62 to rotate in a state where the rotation axis of the drive transmission member 1 and the rotation axis of the drum 62 are coaxial with each other.

<Structure of Driving Side Drum Flange Unit and Engaging Operation of Coupling>

Next, the description will be made as to the operation in which the axis of the drive transmission member 1 is in the state of being inclined relative to the axis of the drum 62 after the cartridge B mounting is completed, then a driving force acts, the drive transmission member 1 engages with the first coupling portion 72, and the axis of the drive transmission member 1 becomes coaxial with the axis of the drum 62.

Figure 9:
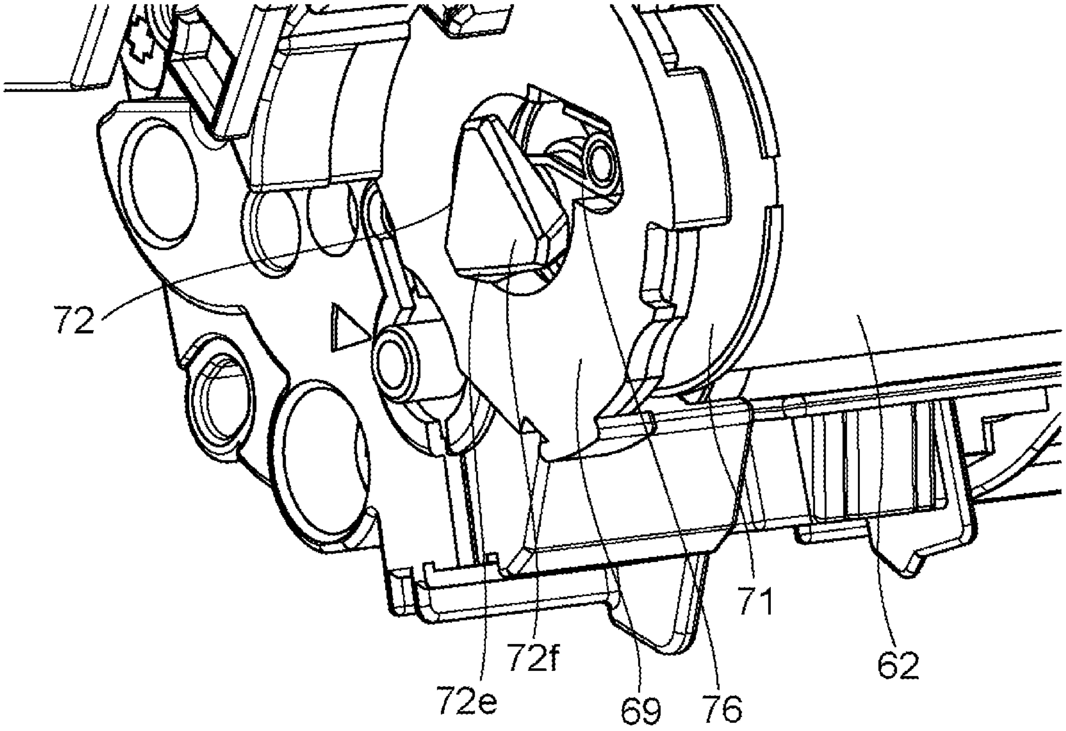
FIG. 9 is a perspective view of the process cartridge.
Figure 10:
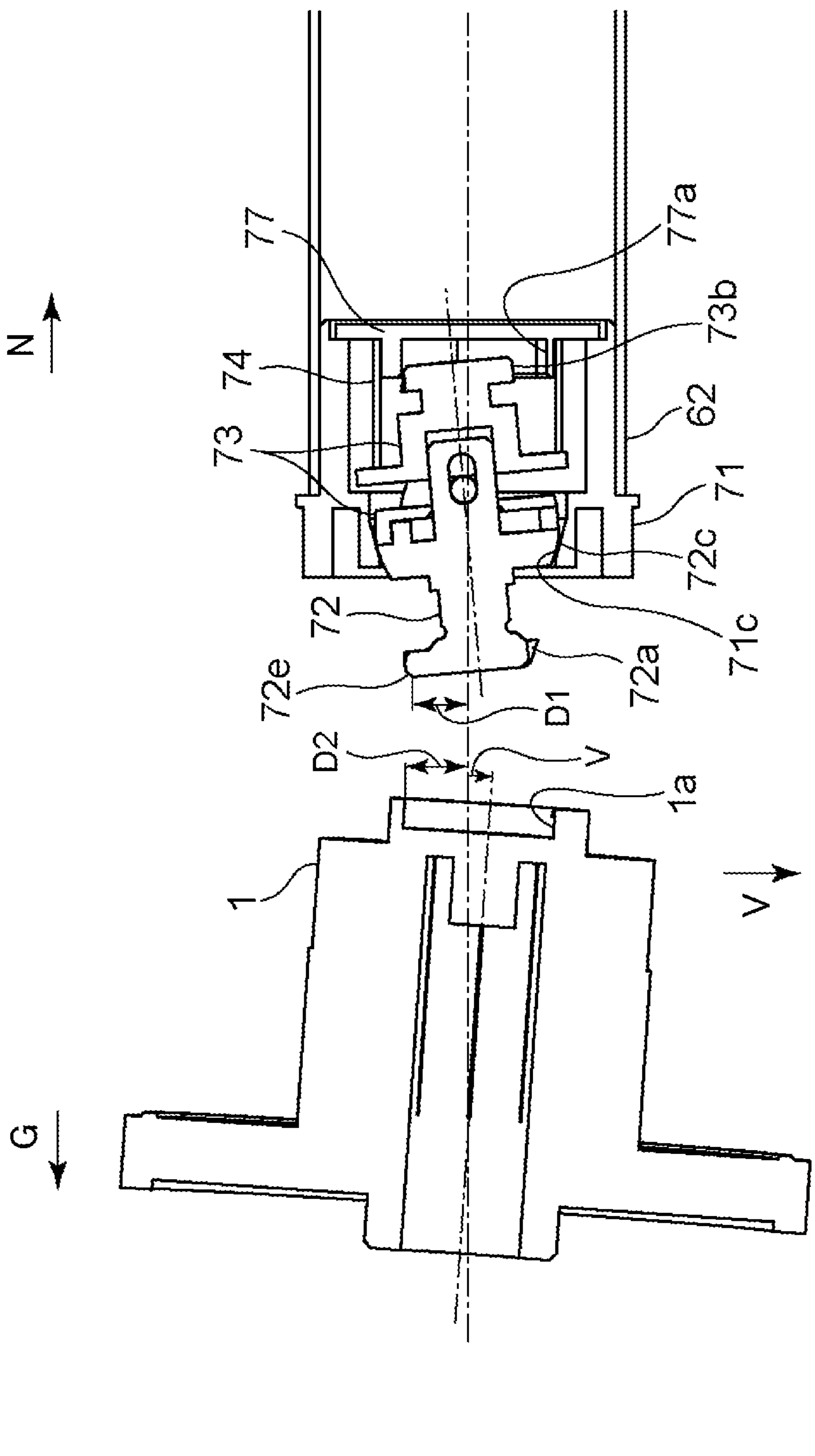
FIG. 10 is a cross-sectional view of the image forming apparatus main assembly and the process cartridge.

Referring first to FIGS. 8, 9 and 10, the structure of the driving side drum flange unit (drive transmission unit) 70 will be described. Parts (a), (b) and (c) of FIG. 8 are illustrations of a method of assembling the coupling unit 79. Part (d) of FIG. 8 is an illustration of a method of assembling the driving side drum flange unit 70. Part (e) of FIG. 8 is an illustration of a method of assembling the drum unit.

FIG. 9 is a perspective view illustrating the structures of the first coupling portion 72 and the third urging member (third elastic member, third spring) 76. FIG. 10 is a sectional view illustrating a state of the drive transmission member 1 and the driving side drum flange unit 70 when the cartridge B is mounted on the apparatus main assembly A but is not driven.

The unified members which rotate together with the photosensitive drum 62 are called a drum unit. The drum unit includes the photosensitive drum 62, the driving side drum flange unit 70, and the non-driving side drum flange 63. A driving side drum flange unit 70 is fixed to one end of the photosensitive drum, and a non-driving side drum flange 63 is fixed to the other end (second end), opposite to the one end, of the photosensitive drum.

The driving side drum flange unit 70 includes a driving side drum flange 71, a first coupling portion 72, a second coupling portion 73, a first urging member 74 (first elastic member, first spring, axial urging member), a second urging member 75 (the second elastic member, the second spring, the radial urging member), a pin 78, and a lid member 77.

The first coupling portion 72 is provided with a driven transmission portion (driving force receiving portion) 72*a* to which a driving force is transmitted from the drive transmitting member 1 of the apparatus main assembly A. The first coupling portion 72 transmits a driving force to the second coupling portion 73 by way of the pin 78 (second contact portion). The first coupling portion 72 and the pin 78 may be made integral. The second coupling portion 73 includes a driven transmission portion 73*a* (second contacted portion) for receiving the driving force from the first coupling portion 72, and a drive transmission portion 73*b* (first contact portion 1) for transmitting the drive to the lid member 77. The lid member 77 is provided with a driven transmission portion 77*a* (first contacted portion) for receiving a driving force from the second coupling portion 73.

In the first coupling portion 72 and the second coupling portion 73, as shown in part (a) of FIG. 8, the shaft portion 72*k* is inserted into the hole portion 73*k*, and the second coupling portion 73 is rotatably supported so as to be rotatable relative to the first coupling portion 72. Further, as shown in part (b) of FIG. 8, a second urging member 75 for urging in the rotational direction is provided between the first coupling portion 72 and the second coupling portion 73. In this embodiment, the second urging member 75 comprises a torsion coil spring, and opposite ends of the spring are in contact with the spring hooking portion 72*h* of the first coupling portion 72 and the spring hooking portion 73*h* of the second coupling portion 73, respectively, restricts movement in the rotational direction. And, as shown in part (c) of FIG. 8, the coupling unit (coupling member) 79 is constituted by penetrating the pin 78 through the pin insertion holes 72*d* and 73*d*.

Subsequently, as shown in part (d) of FIG. 8, after the coupling unit 79 is inserted into the driving side drum flange 71, a first urging member 74 for urging the coupling unit 79 to the driving side is provided. Thereafter, the lid member 77 is fixed to the driving side drum flange 71 by means such as welding to form the driving side drum flange unit 70. As shown in part (e) of FIG. 8, the driving side drum flange unit 70 and the non-driving side drum flange 63 are inserted into the drum 62 and fixed by means such as press-fitting or clamping.

The drum unit (62, 70, 63) assembled in this manner is rotatably supported by the frame (drum bearing 69) of the cartridge B. The drum unit (62, 70, and 73) can be mounted to the apparatus main assembly A as a part of the cartridge B.

The pin 78, the first coupling portion 72, and the second coupling portion 73 of the drum unit are collectively referred to as a coupling member. This coupling member (72, 73, 78) is connected with a drive transmission member (which will be described hereinafter) of the apparatus main assembly A to transmit a drive force (rotational force) from the apparatus main assembly A toward the drum 62. In this embodiment, the coupling member is a unit which can be disassembled into a plurality of members (78, 72, 73), but the structure is not limited to this example, and the coupling member may have one integral structure. For example, instead of connecting the first coupling portion 72 and the second coupling portion 73 with a pin 78, the first coupling portion 72 and the second coupling portion 73 may be one component. Such a structure will be described hereinafter. Further, the lid member 77 and the driving side drum flange 71 may be collectively referred to as a flange member, or the lid member 77 may be deemed as a part of the driving side drum flange 71.

The flange member (71, 77) is fixed to one end of the drum 62, and connects the drum 62 and the coupling member (72, 73, 78), for drive transmission. The flange member is an end member mounted to the end of the drum 62. The coupling member (72, 73, and 78) is supported by the flange member so that the coupling member (72, 73, and 78) is placed in the neighborhood of the end portion of the photosensitive drum 62.

The flange member (71, 77) transmits the driving force from the coupling member (72, 73, and 78) to the drum 62.

The flange member (71, 77) is a cartridge-side transmission member (driving force transmitting member) which transmit the driving force.

The flange member (71, 77) is also a connecting member which connects the coupling member (72, 73, 78) with the drum 62. The coupling member (72, 73, and 78) is indirectly connected to the drum 62 by way of the flange member (71, 77). As described above, the coupling member is connected with the drum 62 so that the drive can be transmitted. In other words, the coupling members (72, 73, and 78) are operatively connected to the drum 62. That is, they are connected with each other such that as the coupling members (72, 73, and 78) rotate, the drum 62 is rotationally driven (operated).

Although the details will be described hereinafter, the coupling member (72, 73, and 78) is tiltably supported by the flange member (71, 77). The flange member (71, 77) is also a support member which supports the coupling members.

Figure 16:
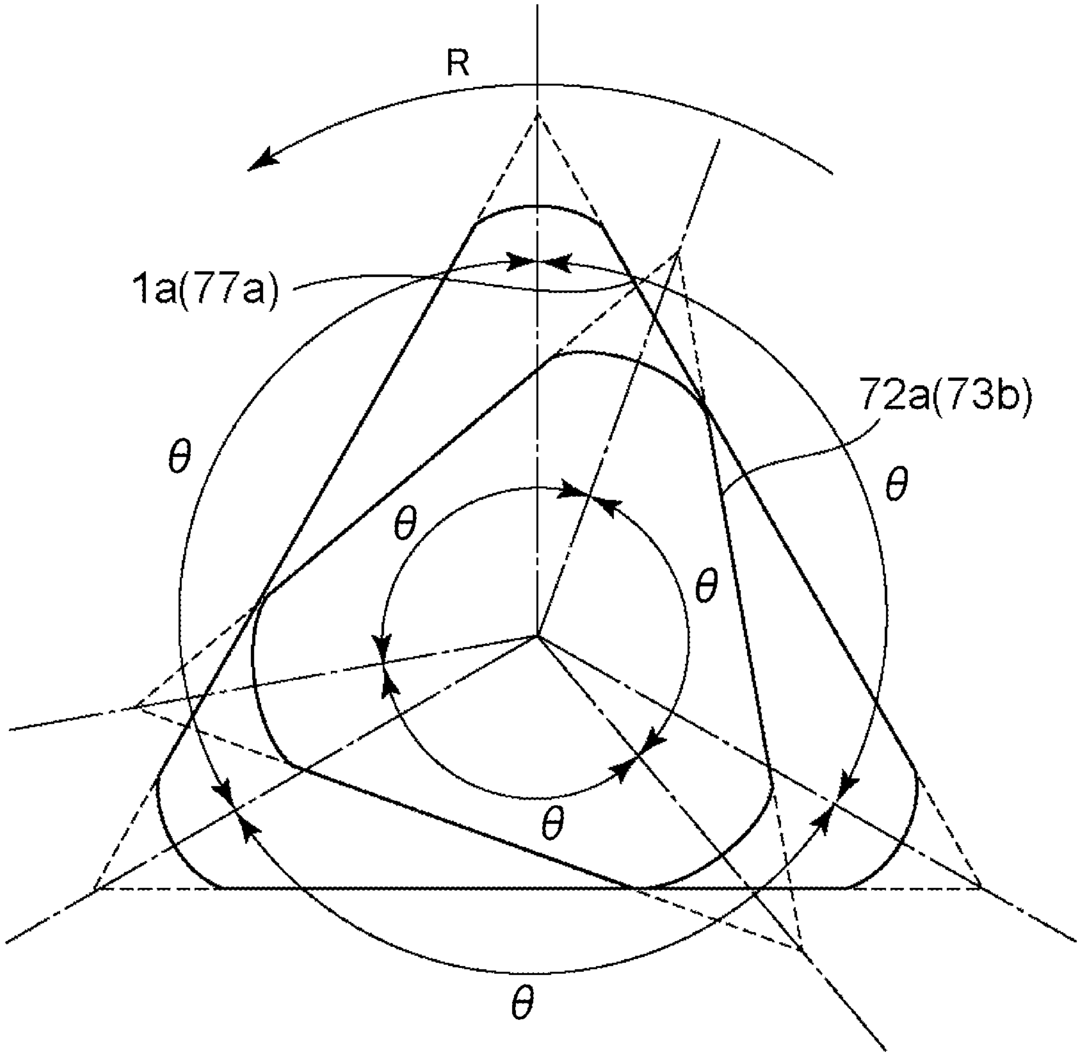
FIG. 16 is a cross-sectional view of a drive transmission portion and a non-drive transmission portion.

In this embodiment, for the driven transmission portion (driving force receiving portion, drive input portion) 72*a* of the first coupling portion 72, a projection shape having a substantially triangular cross-section is employed (see FIG. 16). Specifically, a shape in which a member having a substantially triangular cross-section is twisted counterclockwise about the axis of the drum 62 from the driving side to the non-driving side is employed.

As shown in FIG. 9, a chamfered portion 72*e* inclined in the longitudinal direction is provided on each of the triangular ridge lines of the driving side end portion of the first coupling portion 72. Further, as shown in FIG. 10, the size of the chamfered portion 72*e* is such that when the drive transmission member 1 is inclined in the V direction due to its own weight, a part of the chamfered portion 72*e* is located in a drive transmission portion 1*a* of the drive transmission member 1 in the radial direction. Specifically, as shown in FIG. 10, the minimum distance D1 from the drum center axis to the chamfered portion 72*e* is selected to be smaller than the distance D2 from the drum center axis to an entrance of the drive transmission portion of the drive transmission member 1.

In addition, the drive transmission portion 73*b* of the second coupling portion 73 and the driven transmission portion (driving force receiving portion) 77*a* of the lid member 77 are engaged with each other, and the cross-section of the drive transmission portion 73*b* is substantially triangular.

Further, as shown in FIG. 10, the first coupling portion 72 is brought by the first urging member 74 closer to the driving side in the longitudinal direction (direction of arrow G). By this, the spherical restricted portion 72*c* of the first coupling portion 72 abuts on the conical restricting portion 71*c* of the driving side drum flange 71. By this, when the cartridge B mounting is completed, a part of the first coupling portion is assuredly engaged inside of the drive transmission portion 1*a* in the longitudinal direction (see part (a) of FIG. 1. Here, the drive transmission portion 73*b* and the driven transmission portion 77*a* is a centering portion having a centering function to make the rotation axis of the second coupling portion 73 aligned with the rotation axis of the lid member 77 (drum 62). That is, the drive transmission portion 73*b* and the driven transmission portion 77*a* urges the second coupling portion 73 in the direction tending to reduce the inclination angle of the second coupling portion 73 relative to the lid member 77 when the second coupling portion 73 rotates relative to the lid member 77.

Figure 11:
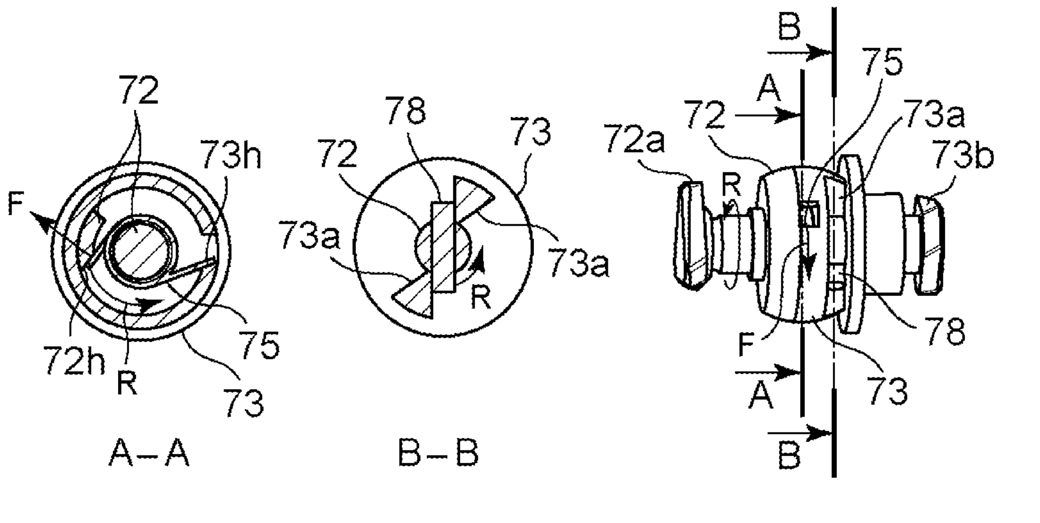
FIG. 11 is an illustration of a coupling unit.
Figure 11:
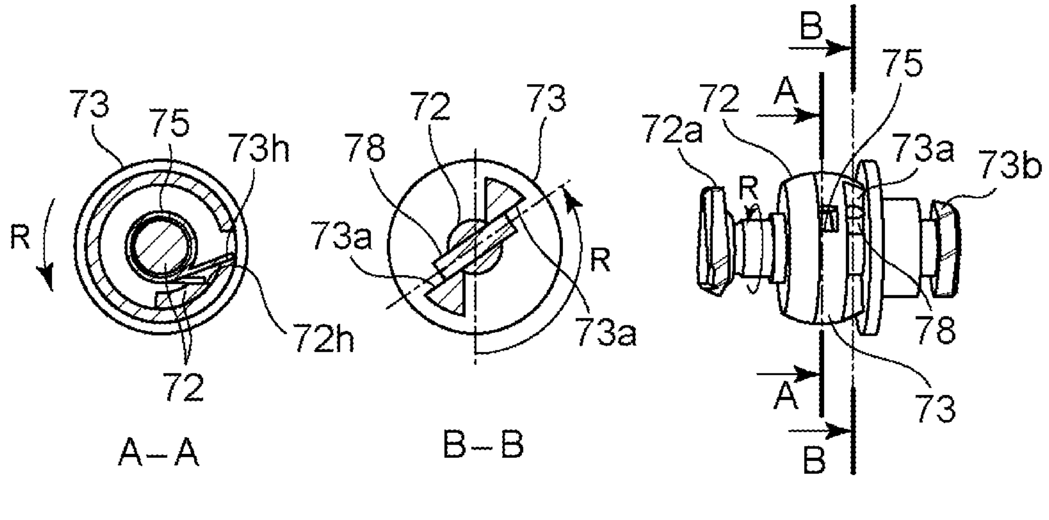

Next, referring to FIGS. 1 and 11, the engaging operation of the first coupling portion 72 and the second coupling portion 73 will be described. FIG. 1 is an illustration of an engagement operation of the drive transmission member 1, the first coupling portion 72, and the second coupling portion 73. FIG. 11 is an illustration of the relative positional relationship of the first coupling portion 72 relative to the second coupling portion 73.

Part (a) of FIG. 1 shows a state in which the drive transmission portion 1*a* of the drive transmission member 1 and the driven transmission portion 72*a* of the first coupling portion 72 are out of phase with each other after the cartridge B is mounted on the apparatus main assembly A. From here, when the drive transmission member 1 is rotated, the drive transmission member 1 is swung, by the chamfered portion 72*e* of the first coupling portion 72, in the direction (part (a) of FIG. 1, arrow W) tending to reduce the inclination angle of the drive transmission member 1 which is in the tilted state by its own weight in the direction of the arrow V. At the same time, the drive transmission member 1 is pulled toward the non-driving side (direction of arrow N) due to the twisted shape, and as shown in part (b) of FIG. 1, a surface 1*f* of the drive transmission member 1 is brought into abutment to an end surface 72*f* of the first coupling portion 72. Here, the surface 1*f* of the drive transmission member 1 and the end surface 72*f* of the first coupling portion 72 are perpendicular to the rotation axes of the drive transmission member 1 and the first coupling portion 72. At this time, the driven transmission portion 72*a* of the first coupling portion 72 and the drive transmission portion 1*a* of the drive transmission member 1 are structured to assure an engagement amount in the longitudinal direction required for stable drive transmission. In addition, the centers of the triangles are aligned upon matching of the phases of the triangles, and the rotation axes of the drive transmission member 1 and the first coupling portion 72 are aligned with each other by abutment between the surfaces perpendicular to the rotation axes. Thus, the engagement operation between the drive transmission member 1 and the first coupling portion 72 is completed.

In this embodiment, the inclination direction of the drive transmission member 1 is the gravity direction, but the inclination direction is not limited to the gravity direction, and if, the above-described condition that a part of the chamfering portion 72*e* is located inside the drive transmission portion 1*a* is satisfied, the engagement is possible irrespective of the direction of the inclination. Further, even when the rotation axes of the first coupling portion 72 and the drive transmission member 1 are neither parallel nor coaxial, the first coupling portion 72 can be engaged with the drive transmission member 1 if the above-described condition is satisfied.

As described above, the drive transmission member 1 and the first coupling portion 72 become in an engaged state, and drive transmission from the apparatus main assembly A to the cartridge B is enabled. At this time, the drive transmission member 1 and the first coupling portion 72 are coaxial with each other, but they are still in an inclined state relative to the drum 62. Next, the description will be made as to the structure by which the drive transmission member 1 and the first coupling portion in a state where the rotation axes thereof are inclined relative to the rotation axis of the drum are made coaxial with the rotation axis of the drum.

Inside the driving side drum flange 71, the second coupling portion 73 coaxially and rotatably supported relative to the first coupling portion 72 is provided. Between the first coupling portion 72 and the second coupling portion 73, there is a latitude of 120° or more due to the pin insertion hole 73*d* in the rotational direction. Before the start of rotation, the first coupling portion 72 takes a first position (See part (a) of FIG. 11) relative to the second coupling portion 73 due to the urging by the second urging member 75 in the direction (direction of arrow F) opposite to the rotational direction which is the direction during driving. Then, when the first coupling portion 72 is rotated by 120° or more, it is moved to a second position (see part (b) of FIG. 11 where the pin 78 abuts on the non-drive transmission portion 73*a*. Here, for the second coupling portion 73, the pin 78 abuts on the non-drive transmission portion 73*a*. Since the driving force is received from the first coupling portion 72, the second coupling portion 73 does not rotate until the first coupling portion 72 moves from the first position to the second position.

Subsequently, when the second coupling portion 73 is in the second position (see part (b) of FIG. 11, the pin 78 abuts on the driven transmission portion 73*a*, so that the driving force of the first coupling portion 72 is transmitted, the second coupling portion 73 becomes in the rotatable state. When the second coupling portion 73 rotates further, as shown in part (c) of FIG. 1, the drive transmission portion 73*b* of the second coupling portion 73 engages with the driven transmission portion 77*a* of the lid member 77, and the lid member 77 becomes rotatable. At this time, the triangular phases of the drive transmission portion 73*b* and the driven transmission portion 77*a* are aligned, and the second coupling portion 73 is pulled toward the non-driving side (in the direction of arrow N) due to the twisted shape, and the end surface 73*f* is brought into contact with the surface 77*f* of the lid member 77. Here, the end surface 73*f* of the second coupling portion 73 and the surface 77*f* of the lid member 77 are perpendicular to the rotation axis of the second coupling portion 73 and the lid member 77. When the phases of the triangles match, the centers of the triangles match, and by the faces perpendicular to the rotation axes abutting each other, the rotation axes become parallel with each other. Therefore, the rotation axes of the second coupling portion 73 and the lid member 77 are aligned with each other. Since the lid member is fixed to the driving side drum flange 71 and the driving side drum flange 71 is fixed to the drum 62, the rotation axis of the second coupling portion 73 is coaxial with the drum 62.

Here, the rotation axes of the drive transmission member 1 and the first coupling portion 72, and the rotation axes of the second coupling portion 73 and the drum 62 are aligned with each other. Since the first coupling portion 72 and the second coupling portion 73 are coaxial, the drive transmission member 1 and the drum 62 can rotate with the rotation axes thereof aligned with each other.

As described above, in this embodiment, the first coupling portion 72 can be engaged with the drive transmission member 1 having an axis inclined relative to the axis of the drum 62, and they can be made coaxial with the drum 62. With such structures, the drive transmission accuracy from the apparatus main assembly A to the cartridge B can be improved.

In this embodiment, the coupling member is provided with the first coupling portion 72 and the second coupling portion 73, which are relatively movable with each other. This provides the advantages described below.

At the stage when the drive transmission member 1 starts rotating, the first coupling portion of the coupling member may not be engaged with the drive transmission member 1. Even in such a case, a frictional force is produced between the first coupling portion 72 and the drive transmission member 1, and as a consequence, the frictional force is liable to cause the first coupling portion 72 to rotate slightly before engaging with the drive transmission member 1. If rotation is transmitted from the first coupling portion 72 to the second coupling portion 73 in the state that the first coupling portion 72 is not engaged with the drive transmission member 1, the above-described centering action unintentionally occurs between the second coupling portion 73 and the flange member (lid member 77). That is, as the second coupling portion 73 engages with the lid member 77 of the flange member, the inclination angle of the second coupling portion 73 relative to the drum 62 becomes smaller. With this action, the inclination angle of the first coupling portion 72 relative to the drum 62 also becomes smaller. If the inclination angle of the first coupling portion 72 is reduced before engaging with the drive transmission member 1, the first coupling portion 72 moves away from the drive transmission member 1 with the consequence that the first coupling portion 72 may not be able to engage with the drive transmission member 1.

Therefore, in this embodiment, the first coupling portion 72 is made can rotatable relative to the second coupling portion 73 within a certain range. Therefore, even if the first coupling portion 72 unintentionally rotates slightly before engaging with the drive transmission member 1, the rotation is not transmitted to the second coupling portion 73. The rotation can be transmitted from the first coupling portion to the second coupling portion 73 only after the drive transmission member 1 and the first coupling portion 72 are securely engaged with each other. Therefore, the centering action does not occur unintentionally before the first coupling portion 72 and the drive transmission member 1 are engaged with each other.

Particularly in this embodiment, as described above, the angle (phase difference) at which the first coupling portion 72 can rotate relative to the second coupling portion 73 from the first position to the second position is set to be 120 degrees or more.

The angle 120 degrees is an angle θ (=120°) (see FIG. 16) between the straight lines connecting the apexes from the center of the equilateral triangle. Even if the drive transmission member 1 and the first coupling portion 72 have different triangular phases when the cartridge is mounted on the main assembly of the apparatus, the phase difference is 120 degrees or less. That is, normally, if the drive transmission member 1 rotates by a maximum of 120 degrees, the triangular shapes of the drive transmission member 1 and the first coupling portion 72 can engage with each other. Even if the first coupling portion 72 is slightly rotated by the above frictional force prior to this engagement, the rotation angle thereby is smaller than 120 degrees, and such rotation of the first coupling portion 72 does not cause the first coupling portion 72 to start rotating the coupling portion 73.

As a result, after the first coupling portion 72 is surely engaged with the drive transmission member 1 and rotated, the rotation of the second coupling portion 73 is started, and then the drum 62 can be rotated.

It can be constrained that the alignment force produced between the second coupling portion 72 and the flange member (77) corrects the inclination of the first coupling portion 72 before the first coupling portion 72 and the drive transmission member 1 are engaged with each other. As a result, it is possible to suppress the occurrence of improper engagement between the drive transmission member 1 and the first coupling portion 72.

However, the coupling member of the coupling unit 79 does not necessarily have to be divided into the first coupling portion 72 and the second coupling portion 73 as described above. For example, in the case that the first coupling portion 72 hardly rotates before engaging with the drive transmission member 1 (the frictional force generated between the first coupling portion 72 and the drive transmission member 1 is sufficiently small, for example), the above structure is not necessary. In such a case, the coupling portion does not have to be divided into the first coupling portion and the second coupling portion 73, and they may be integrated. In addition, even if the coupling member is divided into the first coupling portion 72 and the second coupling portion 73, the rotatable angle of the first coupling portion 72 relative to the second coupling portion 73 may be made smaller than 120 degrees.

As described above, in order to effect the engagement between the drive transmission portion 1*a* of the drive transmission member 1 and the driven transmission portion 72*a* of the first coupling portion 72 and the engagement between the drive transmission portion 73*b* of the second coupling portion 73 and the driven transmission portions 77*a* of the lid member 77, they have respective characteristic shapes. In this embodiment, the shape is employed which is triangle having an equilateral triangular cross-section in the plane perpendicular to the axis of rotation and which has chamfered apexes with arc shapes (see FIG. 16). In order to obtain the same effect as this embodiment, the shape is not necessarily limited to this shape.

<Cartridge Dismounting Operation>

Next, an operation of disengaging the drive transmission member 1 and the first coupling portion 72 in the engaged state and taking out the cartridge B from the apparatus main assembly A will be described.

Figure 12:
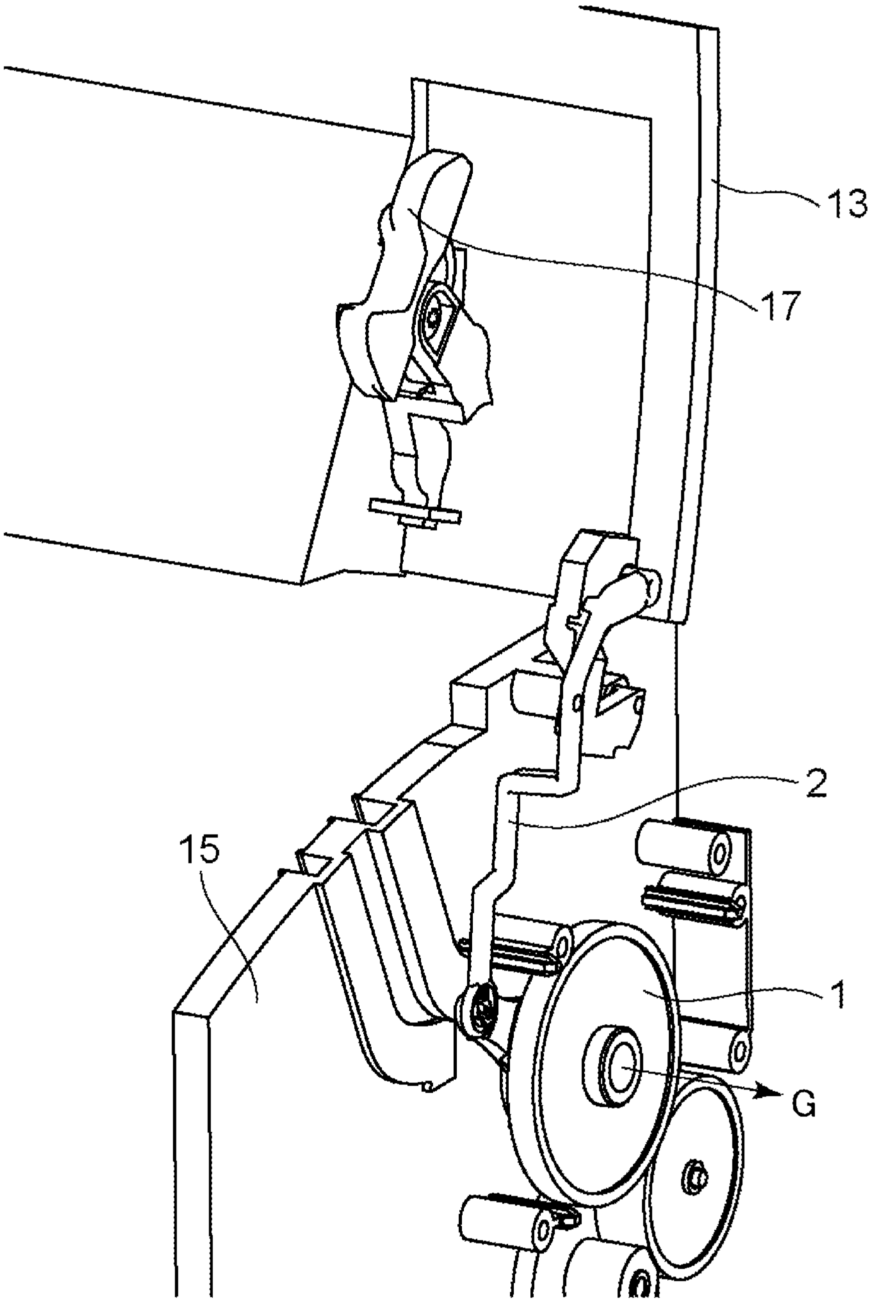
FIG. 12 is a perspective view of the main assembly of the image forming apparatus.

When the cartridge B is pulled out to the outside, the connecting member 2 (FIG. 12) interlocked with the opening/closing door 13 rotates so that the connecting member 2 moves along an inclined portion (not shown) provided on the driving side plate 15 toward the driving side (direction of arrow G), in the process of opening the opening/closing door 13. Along with this, the drive transmission member 1 moves to the driving side. By this, the drive transmission member 1 moves while rotating in the reverse direction due to the twisted shape of the triangle, and the engagement with the first coupling portion is broken. When the engagement is broken, the drive transmission member 1 and the first coupling portion 72 become in an inclined state again.

The structure of this embodiment described so far can be briefly summarized as follows. The drum unit of this embodiment has a coupling member (79) capable of receiving a driving force (rotational force) through the engagement and connection connecting with the driving transmission member 1 (see FIG. 8). The coupling member 79 is tiltably supported by flange members (71, 77) fixed to the photosensitive drum 1. That is, the angle formed by the rotation axis of the coupling member 79 and the rotation axis of the photosensitive drum 62 changes.

The drive transmission member 1 is inclined inside the apparatus main assembly A (see FIG. 4). The coupling member 79 is also tiltable relative to the photosensitive drum 62 so that it can engage with such a drive transmission member 1 (FIG. 4). In particular, in this embodiment, the cartridge B is provided with an urging member (elastic member, spring) 76 for inclining the coupling member 79 in such a predetermined direction that it can be engaged with the drive transmission member 1 (see FIG. 9). With the coupling member 79 tilted, the coupling member 79 is rotated by receiving a driving force from the drive transmission member 1 (see FIG. 1). When the coupling member 79 rotates relative to the flange member (71, 79), the function of the centering portion (drive transmission portion 73*b*, driven transmission portion 77*a*, See FIG. 8) provided between the coupling member 79 and the flange member (71, 79) applies a force to the coupling member 79 to reduce its inclination angle. By this, the inclination angle between the coupling member 79 and the drive transmission member 1 connected to the coupling member 79 becomes smaller. As a result, the driving force can be stably transmitted from the drive transmission member 1 to the photosensitive drum 62 by way of the coupling members (72, 73) and the flange members (71, 77). In this embodiment, the drive transmission member 1, the coupling members (72, 73), and the photosensitive drum 62 are arranged substantially coaxially at the time of drive transmission, but they do not necessarily have to be coaxial. That is, if the inclination angle of the drive transmission member 1 and the coupling members (72, 73) becomes small, there is provided an effect of improving the accuracy of the drive transmission.

As described above, the drive transmission member 1 may be inclined or tilted inside the main body of the electrophotographic image forming apparatus depending on the support structure for supporting the drive transmission member 1. From the stand point of engaging and the connecting the coupling members (72, 73) with such a drive transmission member 1 to accomplish the drive transmission, the drive transmission structure including the coupling member described in this embodiment is suitable.

Further, a support structure is also conceivable in which the drive transmission member is intentionally tilted so that the drive transmission member 1 does not interfere with the mounting/dismounting operation at the time when the drum unit or the cartridge is mounted or dismounted. The drive transmission structure of this embodiment is also useful for such a support structure.

Further, the driving side drum flange unit (drive transmission unit) 70 of this embodiment is unified with the photosensitive drum to form a drum unit. That is, the drive transmission unit 70 can be mounted to and dismounted from the image forming apparatus main assembly as a part of the drum unit or a part of the cartridge including the drum unit. However, the drive transmission unit 70 does not necessarily have to be integrated with the photosensitive drum, and the drive transmission unit 70 does not necessarily have to be a part of the drum unit or a part of the cartridge.

That is, the drive transmission unit 70 may be a unit (dismountably mountable unit, attachment) or a part thereof which can be mounted to the main assembly of the electrophotographic image forming apparatus by the user. That is, the drive transmission unit 70 may be one which can receive a driving force through connection with the drive transmission member 1 when it is mounted to the main assembly of the electrophotographic image forming apparatus. The object to which the drive transmission unit 70 transmits the drive force may be not the photosensitive drum 62 but another member which may be a developing roller 23, for example. Further, the drive transmission unit does not have to be directly connected to the object (photosensitive drum in this embodiment) which receives the driving force. For example, it is conceivable that the cartridge has a drive transmission unit 70 and a photosensitive drum 62, whereas the cartridges are provided at a position apart from each other and are indirectly connected with each other by way of a gear or the like. Also, in this case, the coupling member of the drive transmission unit 70 can be connected with the photosensitive drum 62, operatively, that is, in the manner capable of drive transmission.

Or, the drive transmission unit 70 may be separable from the drum unit or the cartridge. In such a case, it is preferable that the user first mounts the drive transmission unit 70 to the image forming apparatus main assembly, and thereafter, the user attaches the cartridge or the drum unit to the image forming apparatus main assembly and connects them to the drive transmission unit 70.

In this embodiment, one of the drive transmission portion 73*b* and the driven transmission portion 77*a*, which are the centering portions, has a projection shape (projection, projection portion), and the other has a recess shape (pit, recess portion) which can engage with the projection. By the drive transmission portion 73*b* rotating relative to the driven transmission portion 77*a*, one of the projection shape and the recess shape engages with the other while rotating. Since at least one of the projection shape and the recess shape is twisted, when one of the projection shape and the recess shape is engaged with the other while rotating, the axes of the projection shape and the recess shape are aligned by the action of this twisting. As a result, the inclination angle of the flange members (71, 77) relative to the coupling member 79 becomes small, and the inclination angle of the coupling member 79 relative to the drum 62 also becomes small. By this, the rotation axes of the coupling member 79 and the drum 62 substantially are aligned with each other. In this embodiment, the drive transmission portion 73*b* has a projection shape, and the driven transmission portion 77*a* has a recess shape. In addition, both projection and recess shapes are twisted.

The cross-sectional shapes of the drive transmission portion 73*b* and the driven transmission portion 77*a* are substantially triangular. That is, the cross-section has a shape in which the neighborhood of the apex of the equilateral triangle is arcuated. However, the cross-section may have a different shape.

Embodiment 2

Figure 13:
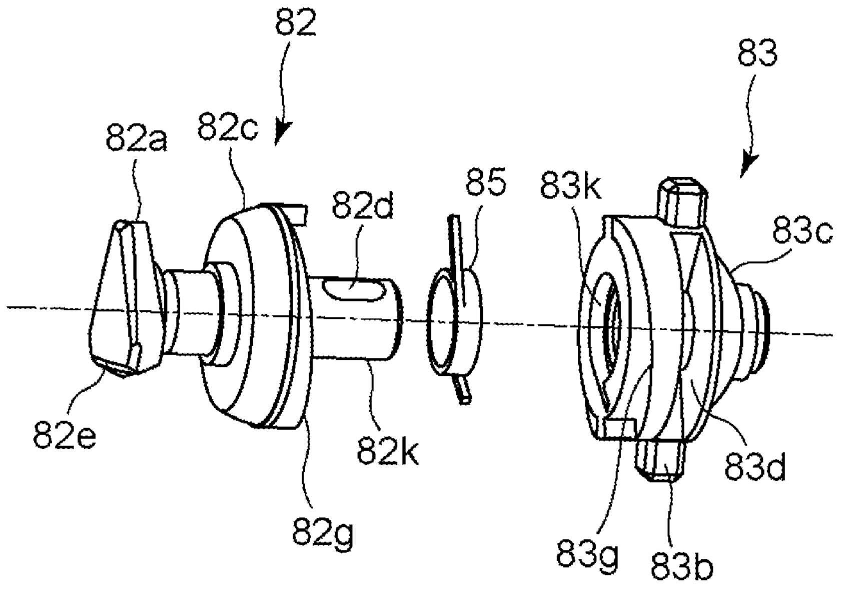
FIG. 13 is an exploded perspective view of a drum flange unit.
Figure 13:
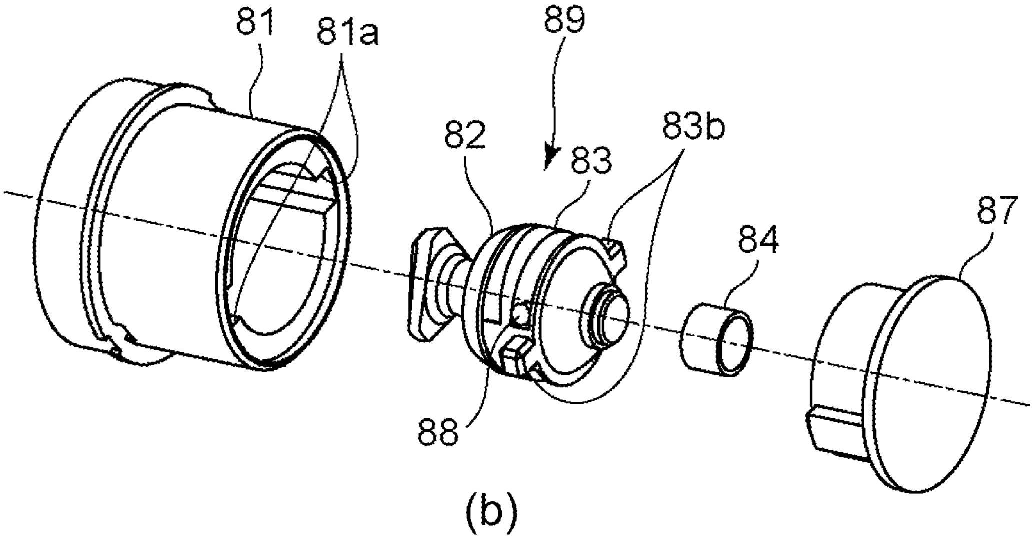

Next, Embodiment 2 will be described. In this embodiment, too, the drive transmission member 1 is structured to be tiltable (inclinable). In Embodiment 2, the mounting/dismounting operation of the cartridge B and the engagement between the drive transmission member 1 and the first coupling portion 82 are the same as those in Embodiment 1, and therefore, the description thereof will be omitted. Embodiment 2 is a modification of the structure of the driving side drum flange unit 80 for changing the state in which the rotation axis of the first coupling portion 82 and the rotation axis of the drum 62 are deviated to the state in which they are coaxial with each other. Therefore, in the following description referring to FIGS. 13, 14, and 15, the description will be made as to a structure in which the drive transmission member 1 and the first coupling portion 82 are made coaxial with the rotation axis of the drum 62 after they are engaged with each other. FIG. 13 is an illustration of a method of assembling the coupling unit 89 and the driving side drum flange unit 80.

Figure 14:
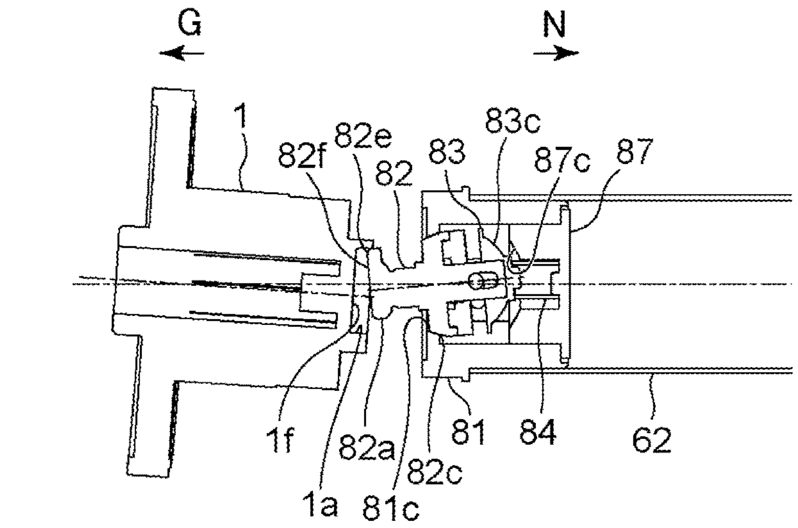
FIG. 14 is a cross-sectional view of an image forming apparatus main assembly and a process cartridge.
Figure 14:
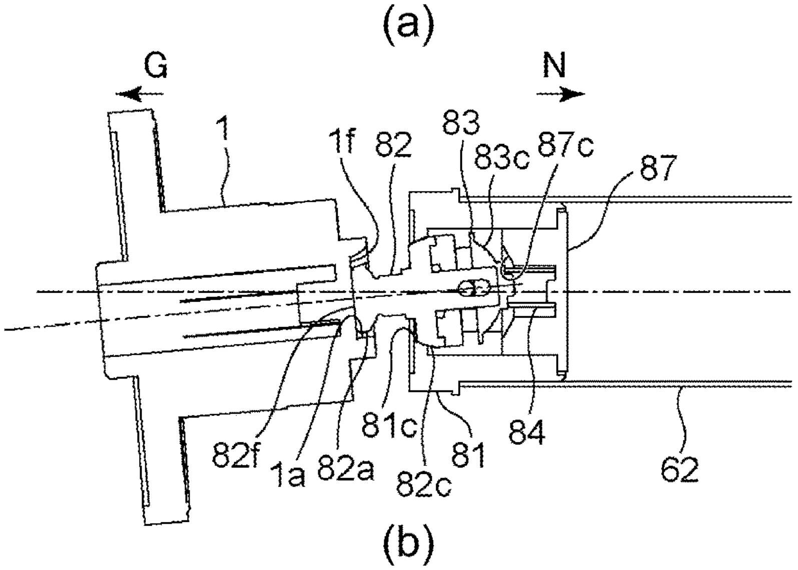
Figure 14:
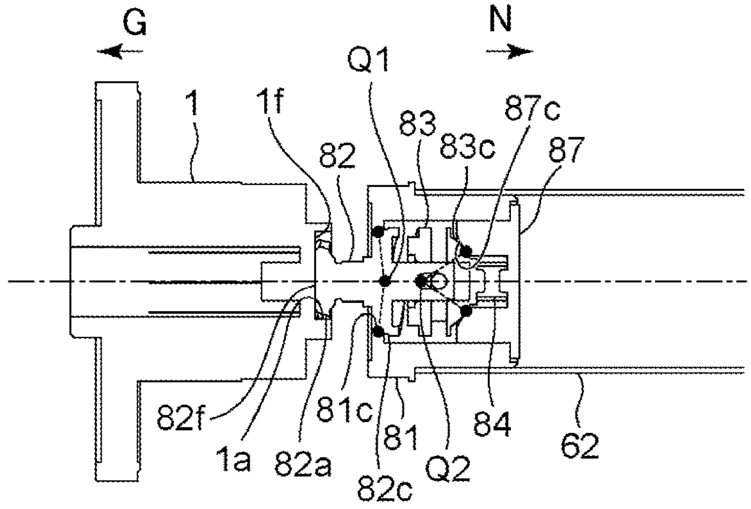
Figure 15:
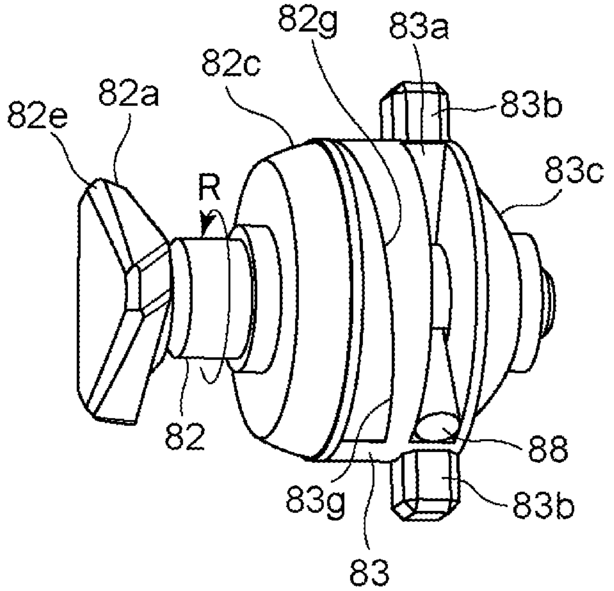
FIG. 15 is an illustration of a coupling unit.
Figure 15:
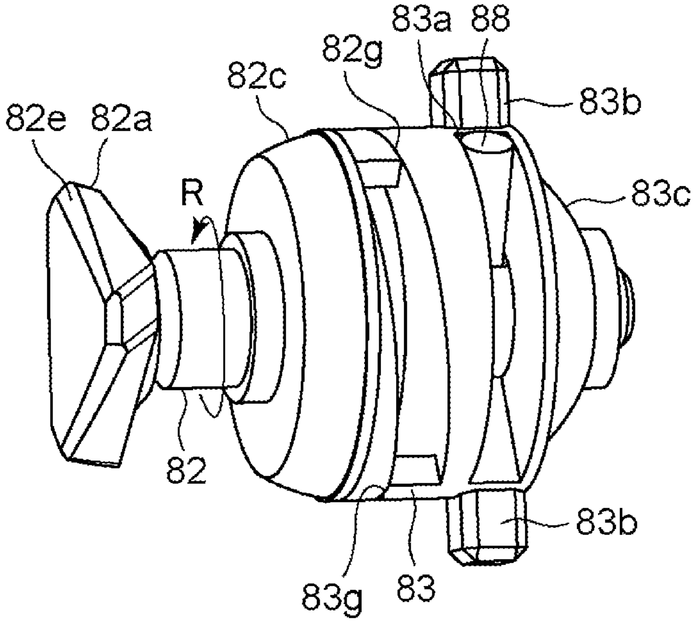

FIG. 14 is an illustration of an engagement operation between the drive transmission member 1, the first coupling portion 82, and the second coupling portion 83. FIG. 15 is an illustration of the relative positional relationship of the first coupling portion relative to the second coupling portion 83.

As shown in part (a) of FIG. 13, the coupling unit 89 comprises a first coupling portion 82, a second coupling portion 83, a second urging member and a pin 88. As shown in part (b) of FIG. 13, the driving side drum flange unit 80 comprises a driving side drum flange 81, a coupling unit 89, a first urging member 84, and a lid member 87.

The drum unit in this embodiment corresponds to a drum unit in Embodiment 1 in which the driving side drum flange unit 70 (see part (e) of FIG. 8 is replaced with a driving side drum flange unit 80. That is, the drum unit in this embodiment includes the driving side drum flange unit 80, the photosensitive drum 62, and a driven side drum flange 63 (see part (e) of FIG. 8.

Further, the driving side drum flange 81 and the lid member 87 may be collectively referred to as a flange member, or the lid member 87 may be regarded as a part of the driving side drum flange 81. The first coupling portion 82 includes a driven transmission portion 82*a* which engages with the drive transmission member 1 to receive a driving force, and includes a shaft portion 82*k*, and is inclined by a third urging member 86 (not shown). The second coupling portion 83 includes a hole portion 83*k* into which a shaft portion 82*k* is inserted and coaxially and rotatably supported by the first coupling portion 82*a* drive transmission portion 83*b* which is engaged with a driven transmission portion 81*a* of the driving side drum flange 81 to transmit a driving force. The first urging member (first elastic member, first spring) 84 urges the first coupling portion 82 and the second coupling portion 83 toward the driving side in the longitudinal direction (direction of arrow G in FIG. 14). Similarly to embodiment 1, the second urging member 85 urges the first coupling portion 82 in the rotational direction relative to the second coupling portion 83.

Further, the first coupling portion 82 and the second coupling portion 83 are provided with inclined portions 82*g* and 83*g* which are in contact with each other, and the movement thereof in the longitudinal direction is enabled by rotation of the first coupling portion 82. When the first coupling portion 82 does not receive the driving force, the first coupling portion is urged in the rotational direction by the second urging member 85, and the pin 88 is inserted into the pin insertion hole 83*d* of the second coupling portion 83 to a first position (see part (a) of FIG. 15 in contact with the end surface thereof. As in Embodiment 1, the pin insertion hole 83*d* of the second coupling portion 83 has a latitude of 120° or more in the rotational direction. Therefore, when the first coupling portion 82 rotates by 120° or more, the pin 88 reaches a second position where it is abutted to the driven transmission portion 83*a* (see part (b) of FIG. 15. Then, the driving force of the first coupling portion 82 is transmitted, and the second coupling portion 83 becomes rotatable. At the same time, at the second position, the second coupling portion 83 moves to the non-driving side (direction of arrow N) along the inclined portions 82*g* and 83*ga* regulated portion 83*c* (second regulated portion) having a spherical shape comes into contact with a conical regulating portion 87*c* (second regulating portion) of the lid member 87.

The second coupling portion 83 is provided with a drive transmission portion 83*b*, the driving side drum flange 81 is provided with a driven transmission portion 81*a* corresponding to the drive transmission portion 83*b*, and the second coupling portion 83 is movable in the longitudinal direction relative to the driving side drum flange 81. When the second coupling portion 83 rotates, the driving side drum flange 81 and the drum become rotatable.

The first coupling portion 82, the second coupling portion 83, and the pin 88 are collectively referred to as the coupling member. The coupling members (82, 83, and 88) are structured to transmit the driving force (rotational force) to the photosensitive drum 62 by way of the flange members (81, 87).

Next, the engaging operation between the first coupling portion 82 and the second coupling portion 83 will be described.

As shown in part (a) of FIG. 14, after the completion of the mounting of the cartridge B, the drive transmission member is tilted and is not engaged with the first coupling portion 82. At this time, in the first coupling portion 82, the spherical regulated portion 82*c* (first regulating portion) is in contact with the conical-shaped regulating portion 81*c* (first regulation) of the driving side drum flange 81 is used by the first urging member 84. Then, as shown in part (b) of FIG. 14, when the drive transmission member 1 rotates, the triangular phases of the drive transmission portion 1*a* and the driven transmission portion 82*a* match each other, and the surface 1*f* of the drive transmission member 1 abuts to the end surface 82*f* of the first coupling portion 82, thereby effecting rotation, as in Embodiment 1. Therefore, the first coupling portion 82 rotates in a state where the rotational axis of the drive transmission member 1 is in alignment with the rotation axis of the first coupling portion 82. Then, the inclined portion 83*g* of the second coupling portion 83 moves along the inclined portion 82*g* toward the non-driving side in the longitudinal direction (direction of arrow N). At this time, while moving along the inclined portion 82*g*, there is a latitude of 120° or more, in the rotational direction, between the first coupling portion 82 and the second coupling portion 83 due to the hole portion 83*d*, and as a result, the coupling portion 83 does not rotate. When it is rotated to a predetermined angle of 120° or more, the second coupling portion 83 moves to the second position on the non-driving side along the inclined portion 82*g* (see part (b) of FIG. 15) as shown in part (c) of FIG. 14, and the spherical regulated portion 83*c* abuts to the conical regulating portion 87*c* of the lid member 87. At the same time, the second coupling portion 83 rotates, and the drive transmission portion 83*b* of the second coupling portion 83 comes into contact with the driven transmission portion 81*a* of the driving side drum flange 81 to rotate the drum 62.

Here, the first coupling portion 82 abuts on the regulating portion 81*c* of the driving side drum flange 81, and the second coupling portion 83 abuts on the regulating portion 87*c* of the lid member 87. Therefore, as shown in part (c) of FIG. 14, the positions of the centers Q1 and Q2 of the regulated portion 82*c* of the first coupling portion 82 and the regulated portion 83*c* of the second coupling portion 83 are determined. Here, the central axis of the conical shape in the regulating portion 81*c* of the driving side drum flange 81 and the central axis of the conical shape in the regulating portion 87*c* of the lid member 87 are both set to be coaxial with the rotation axis of the drum 62. In addition, the centers Q1 and Q2 are set to be placed on the rotation axes of the first coupling portion 82 and the second coupling portion 83, respectively. Therefore, since the first coupling portion 82 and the second coupling portion 83 are coaxial with each other, the straight line connecting the centers Q1 and Q2, that is, the rotation axis of the first coupling portion 82 and the second coupling portion 83 are coaxial with the axis of rotation of the drum 62.

From the foregoing, the rotations are enabled in a state that all the rotation axes of the drive transmission member 1, the first coupling portion 82, the second coupling portion 83, the lid member 88, the driving side drum flange 81, and the drum 62 are aligned.

Similarly to Embodiment 1, the first coupling portion 82 in this embodiment is engageable with the drive transmission member 1 having a structure in which the rotation axis before engagement is inclined relative to the axis of the first coupling portion 82. Further, even in the case that the rotation axes of the first coupling portion 82 and the drive transmission member 1 before engagement are parallel and not coaxial, the first coupling portion 82 of this embodiment can engage with the drive transmission member 1.

In this embodiment, the regulated portion 81*c* of the driving side drum flange 81 and the regulated portion 82*c* of the first coupling portion 82 employ a recess shape having a conical surface and a projection shape having a spherical surface, respectively. Similarly, the regulated portion 87*c* of the lid member 87 and the regulated portion 83*c* of the second coupling portion 83 employ a recess shape including a conical surface and a projection shape including a spherical surface, respectively. In order to provide the same effect as in this embodiment, the relationship between the recess shape having a conical surface and the projection shape having a spherical surface may be reversed.

The regulated portions 81*c* and 87*c* and the regulated portions 82*c* and 83*c* are centering portions in Embodiment 2.

As described above, also in Embodiment 2, similarly to the Embodiment 1, the first coupling portion 82 is engaged with the drive transmission member 1 having an axis inclined relative to the axis of the drum 62, and the coaxial state with the drum 62 can be established. With this structure, the drive transmission accuracy from the apparatus main assembly A to the cartridge B can be improved.

The following is a summary of these embodiments described so far.

With respect to the coupling member of this embodiment, the first coupling portion 82 and the second coupling portion 83 are structured to be movable relative to each other. As shown in part (b) of FIG. 14, the first coupling portion 82 rotates through engagement with the drive transmission member 1. Then, one of the first coupling portion 82 and the second coupling member 83 moves in the axial direction relative to the other. That is, the second coupling portion 83 moves relative to the first coupling portion 82 in the axial direction of the drum (direction of arrow N in part (c) of FIG. 14.

As a result, the regulated portion 82*c* provided on the first coupling portion 82 is contacted (pressed) to the regulated portion 81*c* provided on the flange member (driving side drum flange 81). Further, the regulated portion 83*c* provided in the second coupling portion 83 is contacted (pressed) to the regulated portion 87*c* provided in the flange member (lid member 77). By these contacting actions, the coupling members (first coupling portion 82, second coupling portion 83) are centered. That is, the inclination angle of the coupling members (82, 83) relative to the photosensitive drum 62 becomes small. As a result, as shown in part (c) of FIG. 14, the drive transmission member 1, the coupling members (82, 83), and the photosensitive drum 62 are arranged substantially coaxially, and the accuracy of these drive transmissions is improved.

The first coupling portion 82 and the second coupling portion 83 have inclined portions 82*g* and 83*g* (see part (a) of FIG. 13 for cam mechanism. Therefore, the structure is such that when the first coupling portion 82 rotates relative to the second coupling portion 83, the relative position between the first coupling portion 82 and the second coupling portion 83 changes in the axial direction along the inclined portions 82*g* and 83*g*.

Further, one of the regulated portion 82*c* provided on the first coupling portion 82 and the regulated portion 81*c* provided on the flange member (driving side drum flange 81) has a spherical projection shape, and the other has a spherical or conical recess shape. Further, one of the regulated portion 83*c* provided on the second coupling portion 83 and the regulated portion 87*c* provided on the flange member (closure member 77) has a spherical projection shape, and the other has a spherical or conical shape.

The centering action is provided by the engagement between the recess shape and the projection shape as described above.

INDUSTRIAL APPLICABILITY

According to the present invention, a drum unit, a drive transmission unit, a cartridge which can be used for an image forming apparatus such as an electrophotographic image forming apparatus, and an electrophotographic image forming apparatus suitable for them, are provided.

The present invention is not limited to the above embodiments, and various change and modifications can be made without departing from the spirit and scope of the present invention. Therefore, the following claims are attached in order to publicize the scope of the present invention.

This application claims priority based on Japanese Patent Application No. 2019-109671 filed on Jun. 12, 2019, and all the contents thereof are incorporated herein by reference.

The invention claimed is:

1. A drum unit for a cartridge, the drum unit comprising:

a photosensitive drum having a rotational axis;

a flange provided at an end of the photosensitive drum coaxially with the photosensitive drum, the flange including an engaging portion; and a coupling supported by the flange such that the coupling is inclinable relative to the flange and the photosensitive drum, the coupling including an engaging portion engageable with the engaging portion of the flange, and the coupling having a rotational axis, wherein the coupling is configured such that (i) the engaging portion of the coupling engages with the engaging portion of the flange in response to rotation of the coupling relative to the flange about the rotational axis of the coupling, and (ii) an inclination angle of the coupling relative to the rotational axis of the photosensitive drum is reduced in response to engagement between the engaging portion of the coupling and the engaging portion of the flange, and wherein the coupling is configured to transmit a driving force to the photosensitive drum through the engaging portion of the coupling and the engaging portion of the flange.

2. A drum unit according to claim 1, wherein one of the engaging portion of the coupling and the engaging portion of the flange includes a projection shaped portion and the other of the engaging portion of the coupling and the engaging portion of the flange includes a recess shaped portion.

3. A drum unit according to claim 2, wherein at least one of the projection shaped portion and the recess shaped portion is twisted.

4. A drum unit according to claim 3, wherein, as taken along a plane perpendicular to a rotational axis of the projection shaped portion, the projection shaped portion has a substantially triangular cross-section.

5. A drum unit according to claim 1, wherein the coupling includes (i) a first coupling portion and (ii) a second coupling portion being configured to receive the driving force from the first coupling portion, the second coupling portion including the engaging portion of the coupling, wherein the first coupling portion is partially rotatable relative to the second coupling portion about the rotational axis of the coupling.

6. A drum unit according to claim 5, further comprising an urging member configured to urge the first coupling portion so as to rotate the first coupling portion relative to the second coupling portion.

7. A drum unit according to claim 5, wherein the first coupling portion is rotatable relative to the second coupling portion by not less than an angle of 120°.

8. A cartridge comprising:

a photosensitive drum;

a frame rotatably supporting the photosensitive drum;

a support member operatively connected to the photosensitive drum such that a driving force can be transmitted from the support member to the photosensitive drum, the support member including an engaging portion, and the supporting member having a rotational axis; and a coupling supported by the support member such that the coupling is inclinable relative to the support member, the coupling including an engaging portion engageable with the engaging portion of the support member, and the coupling having a rotational axis;

wherein the coupling is configured such that (i) the engaging portion of the coupling engages with the engaging portion of the support member in response to rotation of the coupling relative to the support member about the rotational axis of the coupling and (ii) an inclination angle of the coupling relative to the rotational axis of the support member is reduced in response to engagement between the engaging portion of the coupling and the engaging portion of the support member, and wherein the coupling is configured to transmit the driving force to the support member through the engaging portion of the coupling and the engaging portion of the support member.

9. A cartridge according to claim 8, wherein one of the engaging portion of the coupling and the engaging portion of the support member includes a projection shaped portion, and the other of the engaging portion of the coupling and the engaging portion of the support member includes a recessed shaped portion.

10. A cartridge according to claim 9, wherein at least one of the projection shaped portion and the recess shaped portion has a twisted shape.

11. A cartridge according to claim 10, wherein, as taken along a plane perpendicular to a rotational axis of the projection shaped portion, the projection shaped portion has a substantially triangular cross-section.

12. A cartridge according to claim 8, wherein the coupling includes (i) a first coupling portion and (ii) a second coupling portion configured to receive the driving force from the first coupling portion, the second coupling portion including the engaging portion of the coupling, and wherein the first coupling portion is partially rotatable relative to the second coupling portion about the rotational axis of the coupling.

13. A cartridge according to claim 12, further comprising an urging member configured to urge the first coupling portion so as to rotate the first coupling portion relative to the second coupling portion.

14. A cartridge according to claim 12, wherein the first coupling portion is rotatable relative to the second coupling portion by not less than an angle of 120°.

15. A cartridge according to claim 8, further comprising an urging member configured to urge the coupling so as to incline the coupling relative to the rotational axis of the support member.

* * * * *